United States Patent
Bariya

(10) Patent No.: US 12,466,752 B2
(45) Date of Patent: Nov. 11, 2025

(54) METHOD OF DEWATERING

(71) Applicant: Synata Bio, Inc., Warrenville, IL (US)

(72) Inventor: Rubindra Bariya, Plainfield, IL (US)

(73) Assignee: Synata Bio, Inc., Warrenville, IL (US)

( * ) Notice: Subject to any disclaimer, the term of this patent is extended or adjusted under 35 U.S.C. 154(b) by 322 days.

(21) Appl. No.: 18/050,932

(22) Filed: Oct. 28, 2022

(65) Prior Publication Data

US 2023/0145474 A1     May 11, 2023

Related U.S. Application Data

(60) Provisional application No. 63/273,564, filed on Oct. 29, 2021.

(51) Int. Cl.
*C02F 1/66*     (2023.01)
*C02F 9/00*     (2023.01)
(Continued)

(52) U.S. Cl.
CPC ............... *C02F 9/00* (2013.01); *C05F 7/005* (2013.01); *C12P 7/04* (2013.01); *C12P 7/08* (2013.01);
(Continued)

(58) Field of Classification Search
CPC ........... C02F 9/00; C02F 1/66; C02F 11/122; C02F 11/143; C02F 11/147; C02F 1/04;
(Continued)

(56) References Cited

U.S. PATENT DOCUMENTS 6,313,246 B1 * 11/2001 Carter .................. C08F 2/32
524/145
7,285,402 B2    10/2007 Gaddy et al.
(Continued)

FOREIGN PATENT DOCUMENTS

| KR | 10-1016762 B1 * | 2/2011 | ............. C02F 11/14 |
| WO | WO 2002/008438 A2 | 1/2002 | |
| WO | WO-2009132249 A2 * | 10/2009 | ............. C02F 11/04 |

OTHER PUBLICATIONS

English translation of Publication KR 10106762, published Feb. 25, 2011 (Year: 2011).*
U.S. Appl. No. 63/136,025, filed Jan. 11, 2021.
U.S. Appl. No. 63/136,042, filed Jan. 11, 2021.
The International Bureau of WIPO, International Preliminary Report on Patentability issued in International Patent Application No. PCT/US2022/078930 (May 10, 2024).
(Continued)

*Primary Examiner* — Joseph W Drodge
(74) *Attorney, Agent, or Firm* — Leydig, Voit & Mayer, Ltd.

(57) ABSTRACT

Disclosed are methods of dewatering solid byproduct. In some embodiments, the solid byproduct contains particles and is produced from a fermentation process for making an oxygenated compound such as ethanol. The method comprises a chemical sequence for conditioning (pre-treating) the solid byproduct to be dewatered. The solid byproduct (in water) is treated with alkaline material to increase its pH to about 7-8.5. Coagulant is added to the alkaline-treated solid byproduct to reduce charge on the solid byproduct. An agglomerating polymer is then added to increase the average size of the solid byproduct particles to a desired size (e.g., at least about 1 mm). Dewatering can further use known technologies such as screw press, belt press, filter press, centrifuge, and/or a dryer to separate the conditioned or pre-treated byproduct from water. Also disclosed are methods of producing oxygenated product, as well as methods of producing animal feed and/or fertilizer, respectively.

20 Claims, 8 Drawing Sheets

(51) Int. Cl.
  *C02F 11/12* (2019.01)
  *C02F 11/14* (2019.01)
  *C05F 7/00* (2006.01)
  *C12P 7/04* (2006.01)
  *C12P 7/08* (2006.01)
  *C02F 11/122* (2019.01)
  *C02F 11/143* (2019.01)
  *C02F 11/147* (2019.01)

(52) U.S. Cl.
  CPC .............. *C02F 1/66* (2013.01); *C02F 11/122* (2013.01); *C02F 11/143* (2019.01); *C02F 11/147* (2019.01)

(58) Field of Classification Search
  CPC ............ C02F 1/38; C02F 3/28; C02F 11/145; C02F 11/148; C02F 11/185; C02F 2209/06; C02F 11/12; C02F 11/121; C02F 11/127; C02F 11/128; C05F 7/005; C05F 5/008; C05F 17/10; C12M 47/10; C12N 1/02; C12N 1/20; C12P 7/065; C12P 7/02; C12P 7/04; C12P 7/06; C12P 7/08; C12P 7/14; B01D 2251/95; B01D 2258/05; B01D 53/62; B01D 53/84; Y02E 50/10; A23K 10/12; A23K 10/37; A23K 50/75; A23K 50/80; F26B 5/00; F26B 5/08; F26B 5/16
  See application file for complete search history.

(56) References Cited

U.S. PATENT DOCUMENTS

| | | | |
|---|---|---|---|
| 9,469,860 B2 | 10/2016 | Enzien et al. | |
| 9,701,987 B2 | 7/2017 | Smart et al. | |
| 2006/0057264 A1* | 3/2006 | Hughes | C02F 1/5236 426/495 |
| 2008/0169245 A1* | 7/2008 | Roa-Espinosa | C02F 1/56 210/725 |
| 2009/0325253 A1* | 12/2009 | Ascon | C12P 7/08 435/293.1 |
| 2011/0236941 A1 | 9/2011 | Koepke et al. | |
| 2013/0137154 A1* | 5/2013 | Reep | C10J 3/485 44/388 |
| 2013/0158137 A1* | 6/2013 | Oldenburg | C12P 7/6463 554/175 |
| 2014/0273123 A1 | 9/2014 | Tobey et al. | |
| 2015/0132810 A1 | 5/2015 | Hickey | |
| 2015/0225749 A1* | 8/2015 | Hickey | C12P 5/023 435/141 |
| 2015/0246314 A1* | 9/2015 | Constantz | B01D 53/62 423/220 |
| 2016/0159674 A1 | 6/2016 | Allen et al. | |
| 2019/0390158 A1* | 12/2019 | Dyson | A23J 1/008 |
| 2021/0371312 A1* | 12/2021 | Conrado | C10L 3/08 |

OTHER PUBLICATIONS

European Patent Office, International Search Report and Written Opinion of the International Searching Authority in International Patent Application No. PCT/US2022/078930 (Feb. 27, 2023).

* cited by examiner

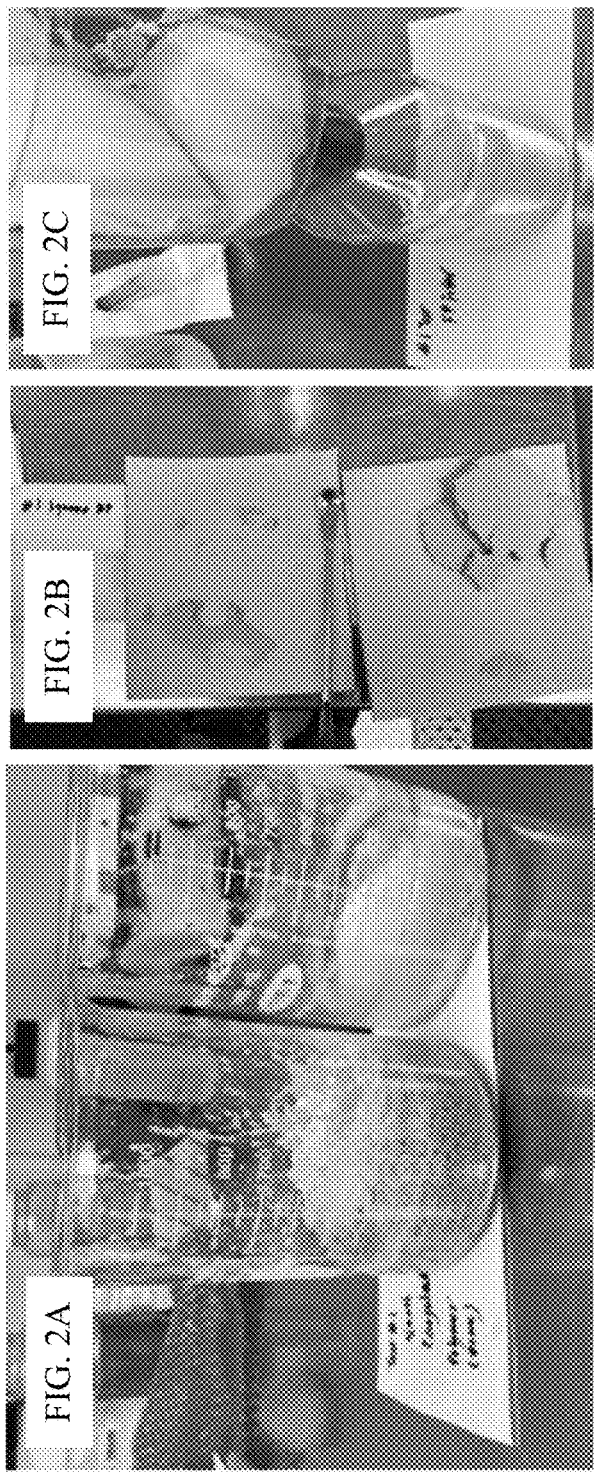
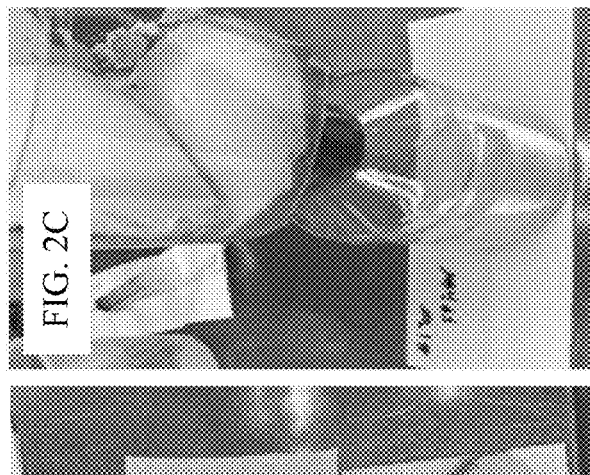
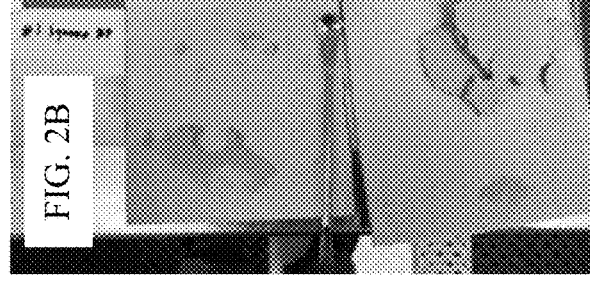
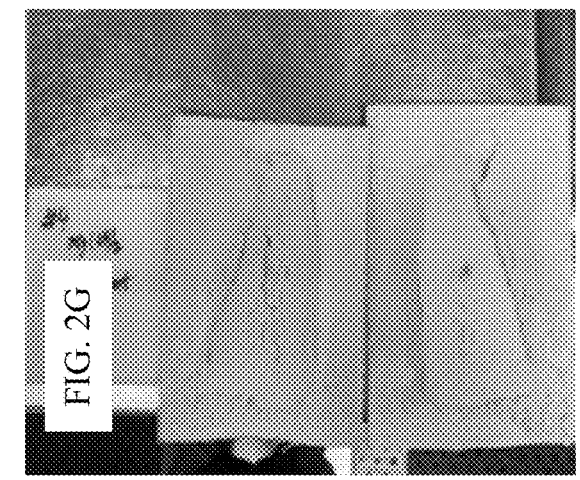
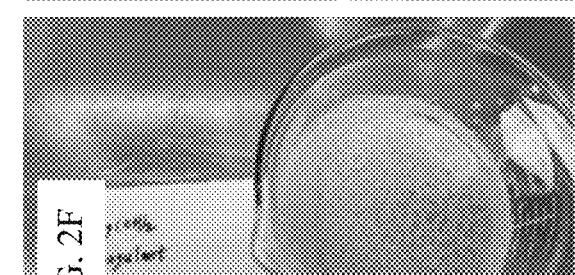
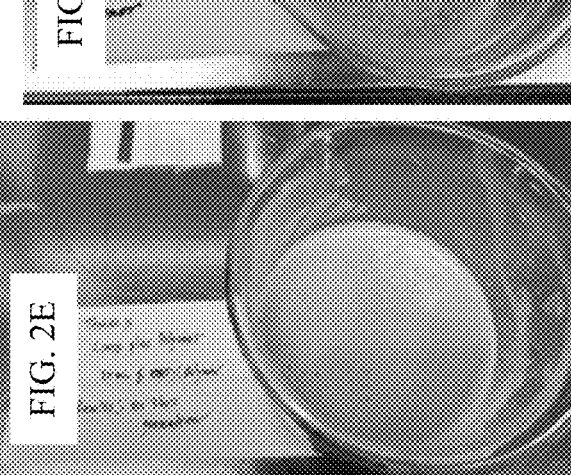
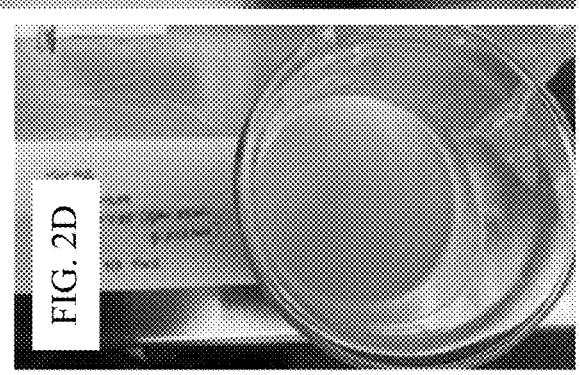

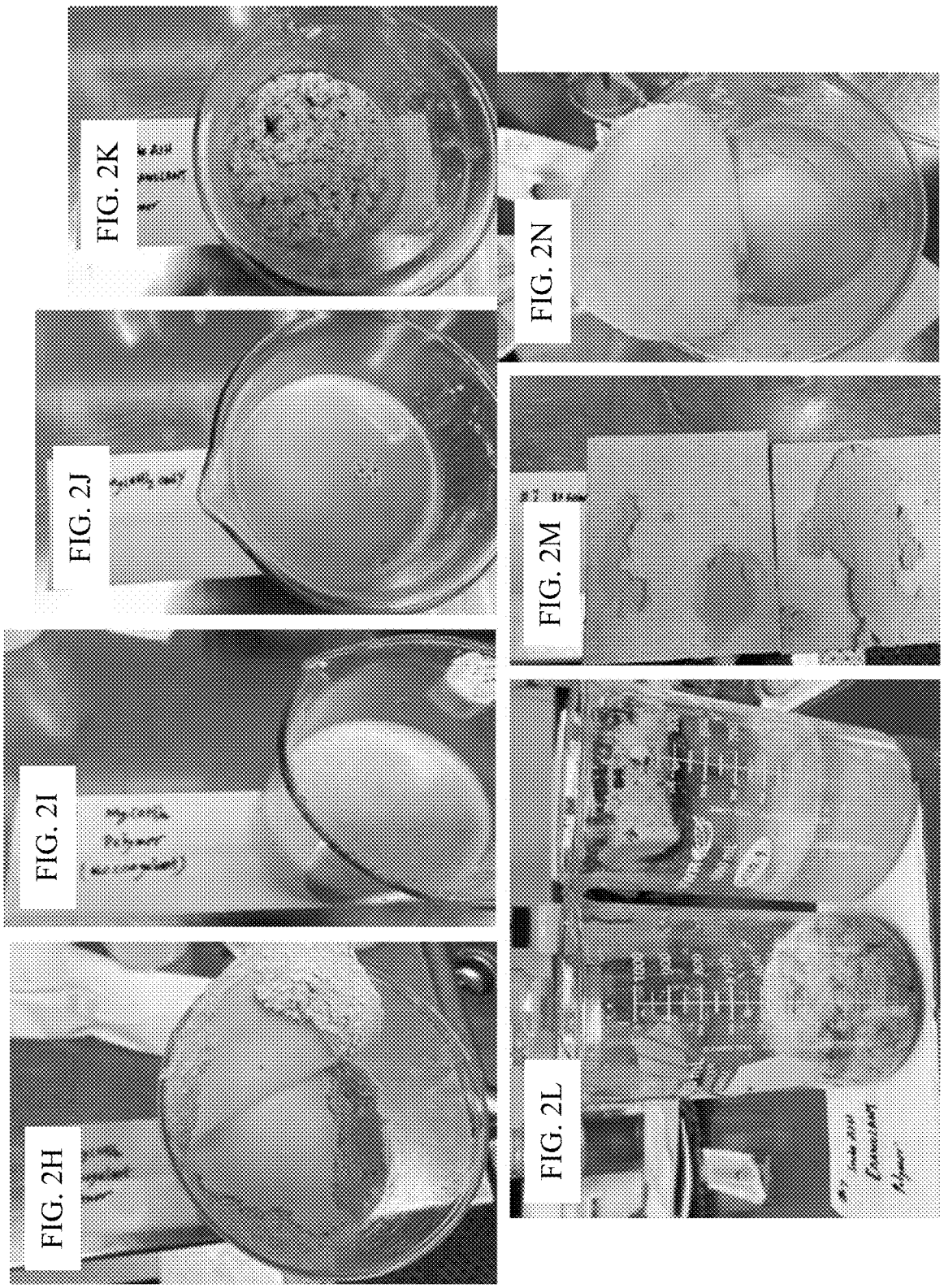

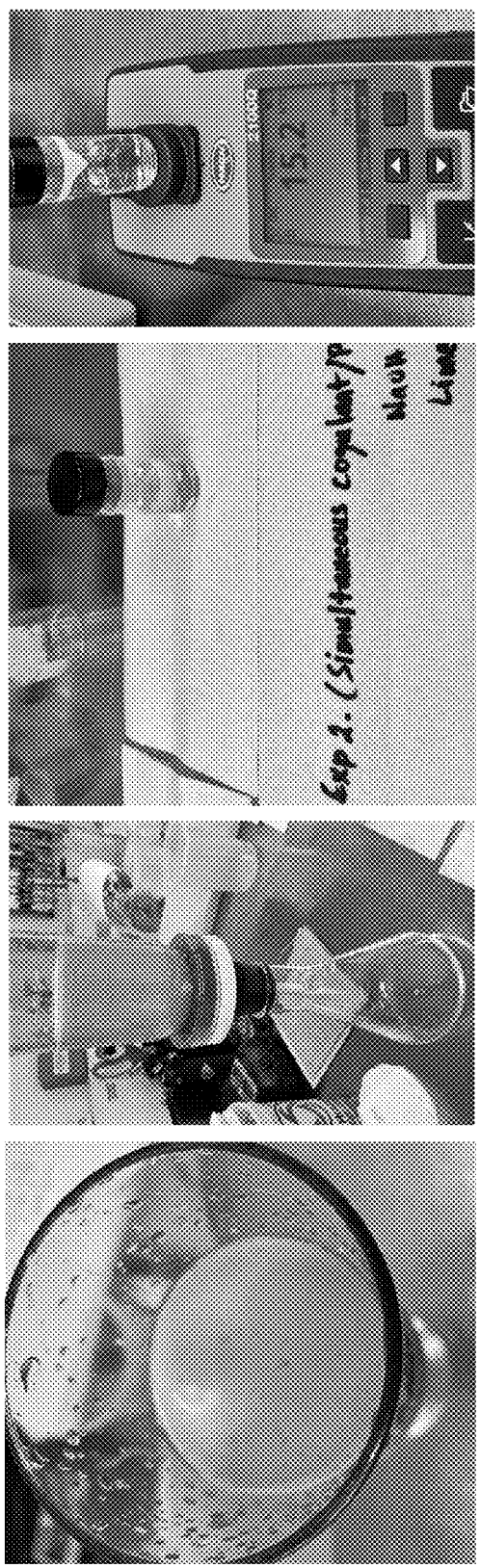

METHOD OF DEWATERING

CROSS-REFERENCE TO RELATED APPLICATIONS

This patent application claims the benefit of U.S. Provisional Patent Application 63/273,564, filed Oct. 29, 2021, which is incorporated by reference.

BACKGROUND

It is desirable to use microorganisms to convert gases containing carbon monoxide (CO), carbon dioxide ($CO_2$), and/or hydrogen ($H_2$), such as industrial waste gas or syngas, into a variety of products, such as fuels and chemicals using fermentation. The low ethanol tolerance of organisms that can consume CO, $CO_2$, and $H_2$ requires the use of continuous fermentation techniques, whereby broth containing ethanol, acetate, and cells are removed from a bioreactor (fermentor) and new growth medium is added. The ethanol and cells are then recovered from the removed broth. The ethanol-depleted removed broth then needs to be subjected to wastewater treatment prior to release, which adds significantly to capital and process costs (e.g., a commercial-scale bioreactor may contain in excess of one million liters of aqueous broth and creating a wastewater treatment system to handle all of the ethanol-depleted removed broth would require significant capital costs).

Accordingly, there remains a need for methods that reduce the need for expensive wastewater treatment and high water use associated with continuous fermentation. One approach to reducing this burden on wastewater treatment is to recycle the ethanol-depleted removed broth back to the bioreactor (referred to as bottoms recycle because it involves the bottoms from distillation). Prior to introduction of bottoms into the fermentation, cells and other biosolids must be removed. Removal of biosolids via centrifugation or other techniques results in a clarified broth fraction suitable for return to the reactor, and a biosolids suspension containing up to 80-95% water, such as up to 40-50% water. This water content of this biosolids suspension must then be reduced prior to disposal of the biosolids (a process called dewatering). Dewatering of solids results in a cake containing biosolids with a significant reduction in moisture content.

Previous attempts to dewater the removed biosolids failed to generate an output cake with an unacceptably high moisture content and stickiness. This is unsatisfactory because less solid is recovered in the output cake. Furthermore, stickiness reduces the efficiency of recovery of the de-watered biosolids from the filtration unit, leading to diminished efficiency for the process. In addition, the typical filtrate from conventional dewatering techniques also suffers from significant total suspended solids in the water. This is unsatisfactory because the filtrate will be transferred to biological wastewater treatments, which may be affected or disrupted by high total suspended solids (TSS).

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of any embodiments of the disclosure to solve any specific problem noted herein.

BRIEF SUMMARY

The invention provides a method of dewatering solid byproduct, as well as methods of preparing oxygenated product, animal feed, and fertilizer, respectively. In this respect, the dewatering methods of the disclosure can be used in a variety of solid/liquid separation applications, and the invention is not limited to any particular application. In one illustration of utility of the methods of the disclosure, oxygenated products such as ethanol can be prepared in a fermentation process, which can be a continuous process if desired. A substrate gas such as synthesis gas (syngas) derived from any suitable source is fermented in a continuous process using a microorganism, e.g., in a bioreactor. The syngas contains some combination of carbon monoxide (CO), carbon dioxide ($CO_2$), and/or hydrogen gas ($H_2$). To facilitate fermentation, the bioreactor generally also contains water, vitamins, and nutrients as known in the art. The fermentation process produces oxygenated compound, as well as biosolids as a type of byproduct.

After fermentation, the oxygenated product can be recovered, e.g., via distillation. In general, biosolids (containing living and dead cells are removed by centrifugation or the like). The supernatant from that process is recycled by returning it to the bioreactor. The centrifuge removes the biosolids with the aid of liquid such that a suspension is formed containing generally, e.g., up to about 80-95% water, such as up to 40-50% water (e.g., from about 40% to about 95%, from about 50% to about 95%, from about 40% to about 80%, from about 50% to about 80%). The suspension is desirably dewatered in accordance with embodiments of the present disclosure. The recovery of the water allows for reduction in the weight and improvement in the stability of the biosolids. Furthermore, reduced water content improves the efficiency of drying steps, if these are carried out. The stability is improved because the reduced water content can lead to decreases in degradation by microbes. The recovered water is in a relatively small quantity and can be sent to, e.g., wastewater treatment. While generally not cost effective, if desired (e.g., if there is a high demand for water), the recovered water could be recycled and used again in the bioreactor for the fermentation process in some embodiments. Because of the dewatering, the process is more efficient as it allows for less frequent removal of solids and hence less interruption. This is a considerable advantage especially in embodiments at very large scale, where generally at least tens of thousands or even hundreds of thousands of liters of material or more are in the bioreactor.

The present disclosure provides for a sequence of chemical treatments of the solid byproduct (e.g., biomass in the form of liquid (stillage)). The treatment can take place in, e.g., a pre-treatment or conditioning tank or mixing tank, although it can occur in any other location as desired, such as in an inline mixer. This treatment surprisingly and unexpectedly facilitates the dewatering and separation of the water from the solid byproduct. In this respect, the solid byproduct particles are treated with alkaline material to increase the pH of the biomass slurry. For example, the pH can be raised to a value of from about 7 to about 8.5. This increase in pH has been found to be surprisingly beneficial in a slurry containing biosolids to stabilize the slurry to enhance its mechanical properties (e.g., lower specific resistance to filtration) to thereby allow for successful filtration after addition of coagulant and flocculant as described herein. In this regard, it has been found that the physical state of the solids affects the efficiency of water removal. For example, the physical properties of the biosolids can lead to stickiness that prevents efficient water removal via, e.g., screw or filter press or other techniques as described herein.

A coagulant is added to the alkaline-treated solid byproduct to reduce charge on the solid byproduct particles. This reduction in charge has been found to decrease the stickiness of the particles and hence facilitate the dewatering process because it produces lower specific resistance to filtration media. Agglomerating polymer is added to the solid byproduct after the coagulant is added. The polymer acts as a flocculant to aid in agglomerating the particles to a relatively larger average size. Any suitable larger average particle size can be used to be compatible with a filter pore size to be selected, as desired. In some embodiments, the agglomeration allows for an average particle size of, e.g., at least about 1 mm. The agglomeration is beneficial in filtration to thereby allow for high solid recovery. The dewatering step, using techniques known in the art or as described herein (e.g., carried out using a screw press, belt press, filter press, centrifuge, and/or ring, spray, or other dryer device), allows for separation of the agglomerated particles and the clarified stream filtrate containing water and colloidal or residual solids. The filtrate can be sent for biological water treatment. The agglomerated particles can be recovered, and in various embodiments, used as animal feed (such as poultry feed, aquatic animal feed), fertilizer, and the like.

Advantageously, embodiments of the disclosure allow for removal of water and hence drying of the byproduct (e.g., biosolids). This enhances certain efficiencies in various embodiments. For example, if the solid byproduct contains less water, it will be lighter and easier to transport thereby generally allowing for reduced shipping or offsite storage expense. In addition, if the solid byproduct is used for, e.g., animal feed or fertilizer in land use applications, any drying step in preparation thereof is simplified since the byproduct is dewatered. The reduction in water in the solid byproduct cake can also desirably reduce susceptibility to degradation of the material due to microbial processes in some embodiments. In addition, the removed water can be more easily handled in waste removal treatment steps since there are less solids associated with the water.

In some embodiments, methods of dewatering according to the disclosure advantageously are able to produce a cake containing an efficient solids content (e.g., at least about 10 wt. % solids, at least about 15% solids, at least about 20% solids, etc.) and clarified filtrate with reduced solids content (e.g., about 1000 ppm or less, about 500 ppm or less, or about 300 ppm or less, etc.). The high solids content in the cake is beneficial because it produces higher solid recovery leading to less energy for the next drying step (e.g., to prepare the solids for use as animal feed, fertilizer, or the like). The low solids content in the clarified stream filtrate is beneficial because it produces readily bio-digestible water for biological treatment. In addition, the sequence of chemical treatment is relatively inexpensive as it does not require significant additional capital expense.

Thus, in one aspect, the disclosure provides a method of dewatering solid byproduct. The method comprises providing a solid byproduct containing water and solid particles. The solid byproduct is treated with alkaline material effective to increase the pH of the solid byproduct to a value of from about 7 to about 8.5 (e.g., from about 7.5 to about 8.1). Coagulant is added to the alkaline-treated solid byproduct. The coagulant is effective to reduce net charge of the particles. Polymer is added to the solid byproduct with reduced net charge. The polymer is effective to agglomerate the particles so they have an average particle size of at least about 1 mm (e.g., from about 1 mm to about 10 mm). The agglomerated solid byproduct particles are removed to produce a cake and a clarified stream filtrate.

In another aspect, the disclosure provides a continuous method of making an oxygenated compound such as ethanol, butanol, butyrate, acetate, propanol, propionate, or any combination thereof. The method comprises providing substrate gas comprising at least two of the following: CO, $CO_2$, and $H_2$. The substrate gas is fermented in a bioreactor with bacteria in a liquid medium to produce a broth including ethanol, water, and solid byproduct. The oxygenated product is removed from the broth to produce an oxygenated product-depleted broth. A solid byproduct is separated from the broth and/or the ethanol-depleted broth. The solid byproduct contains water and solid particles. The solid byproduct is treated with alkaline material effective to increase the pH of the solid byproduct to a value of from about 7 to about 8.5 (e.g., from about 7.5 to about 8.1). Coagulant is added to the alkaline-treated solid byproduct. The coagulant is effective to reduce net charge of the particles. Agglomerating polymer is added to the solid byproduct with reduced net charge. The polymer is effective to agglomerate the biosolid particles so they have an average particle size of at least about 1 mm (e.g., from about 1 mm to about 10 mm). The agglomerated solid byproduct particles are removed to produce a cake and a clarified stream.

In another aspect, the disclosure provides a method of preparing fertilizer. The method comprises providing gaseous substrate comprising at least two of the following $H_2$, CO, and $CO_2$. The gaseous substrate is fermented in a bioreactor with bacteria in a liquid medium to produce a broth including an oxygenated product, water, and solid byproduct. The oxygenated product can be, for example, ethanol, butanol, butyrate, acetate, propanol, propionate, or any combination thereof. The oxygenated product is removed from the broth to produce an oxygenated product-depleted broth. A solid byproduct is separated from the broth and/or the oxygenated product-depleted broth. The solid byproduct contains solid particles. The solid byproduct is treated with alkaline material effective to increase the pH of the solid byproduct to a value of from about 7 to about 8.5 (e.g., 7.5 to about 8.1). Coagulant is added to the alkaline-treated solid byproduct. The coagulant effective to reduce net charge of the particles. Agglomerating polymer is added to the solid byproduct with reduced net charge. The polymer is effective to agglomerate the particles, so they have an average particle size of at least about 1 mm (e.g., from about 1 mm to about 10 mm). The agglomerated solid byproduct particles are removed to produce a cake and a clarified stream, the cake being effective for use as fertilizer.

In another aspect, the disclosure provides a method of preparing animal feed. As used herein, animal feed can be any suitable type of animal feed, such as, for example, aquatic culture (fish feed), poultry feed, cattle feed, hog feed, bird feed, etc. The method comprises providing gaseous substrate comprising at least two of the following: $H_2$, CO, and $CO_2$. The gaseous substrate is fermented in a bioreactor with bacteria in a liquid medium to produce a broth including an oxygenated product, water, and solid particles. The oxygenated product is removed from the broth to produce an oxygenated product-depleted broth. A solid byproduct is separated from the broth and/or the oxygenated product-depleted broth. The solid byproduct contains solid particles. The solid byproduct is treated with alkaline material effective to increase pH of the solid byproduct to a value of from about 7 to about 8.5 (e.g., from about 7.5 to about 8.1). Coagulant is added to the alkaline-treated solid byproduct. The coagulant is effective to reduce the net charge of the particles. Agglomerating polymer is added to the solid byproduct with reduced net charge. The polymer is effective to agglomerate the particles so they have an average particle size of at least about 1 mm (e.g., from about 1 mm to about 10 mm). The agglomerated solid byproduct particles are removed to produce a cake and a clarified stream, the cake being effective for use as the animal feed. In some embodiments, the method of preparing animal feed is useful for producing aquatic culture containing relatively low amounts of one or more toxic metals, such as mercury, iron, nickel, etc.

It will be understood that the preceding aspects are not limited by the descriptions above. Sub-aspects are described in the Detailed Description below, taken with the figures and examples, etc. It will be further understood that various sub-aspects including components, ingredient types, amounts, and properties, as well as other parameters, ranges, and other details described herein are fully contemplated in connection with the aspects above and they can be incorporated as desired into the aspects of the preceding paragraphs unless directly contradicted or expressly excluded.

BRIEF DESCRIPTION OF THE SEVERAL VIEWS OF THE DRAWING(S)

FIGS. 5A-5D are photographs illustrating the results from different experimental and comparative experiments for the dewatering process, as described in Example 2.

DETAILED DESCRIPTION

Figure 1:
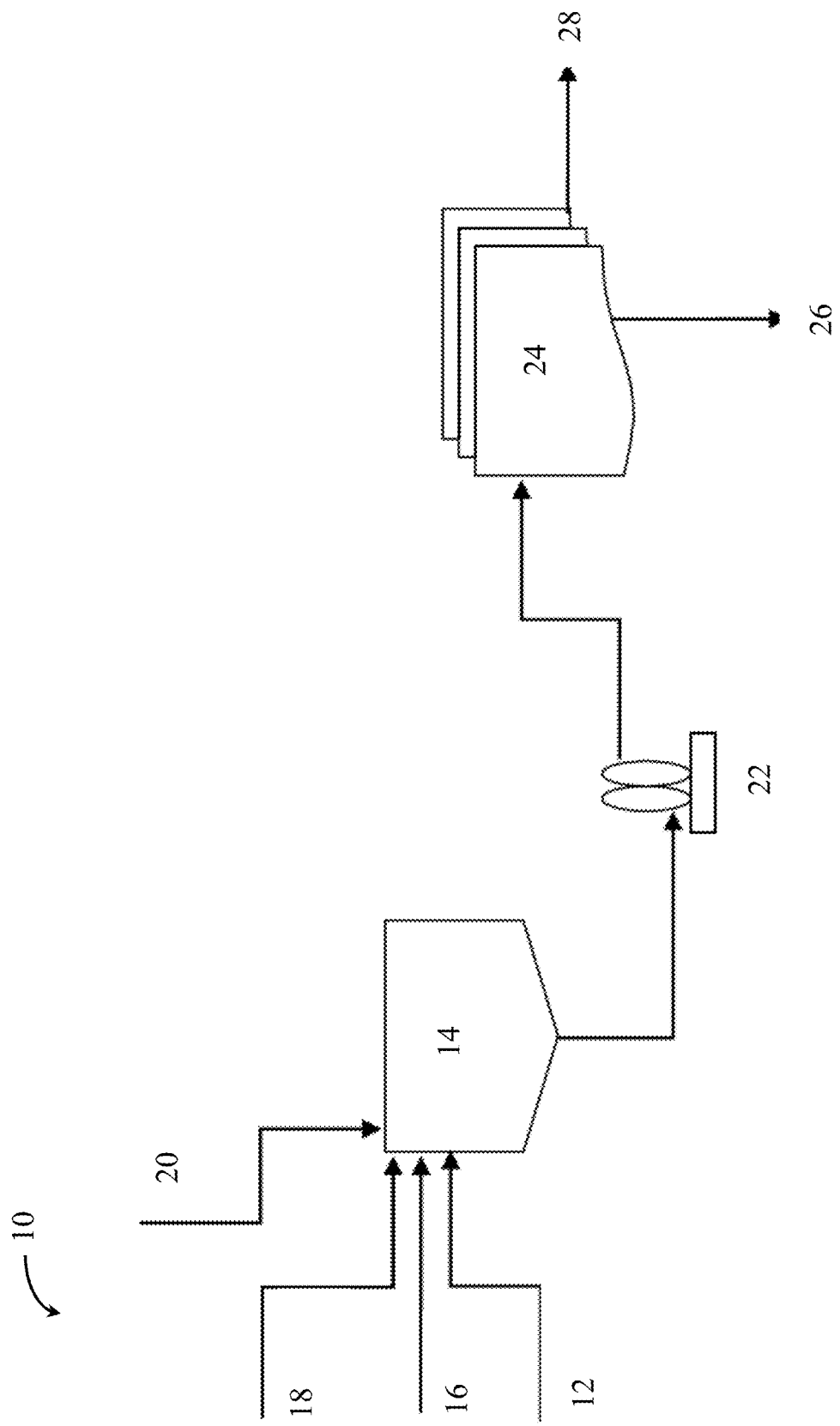
FIG. 1 is a flow diagram, schematically illustrating dewatering of solid byproduct in accordance with embodiments of the disclosure.

Embodiments of the disclosure provide a method of dewatering solid byproduct, as well as a method of preparing an oxygenated product, a method of preparing fertilizer, and a method of preparing animal feed, such as fish feed, poultry feed, cattle feed, hog feed, bird feed, etc. In some embodiments, the method of preparing animal feed is useful for producing aquatic culture containing lower amounts of one or more toxic metals, such as mercury, iron, nickel, etc.

Methods of Dewatering and Methods of Preparing Oxygenated Compound, Animal Feed, and/or Fertilizer Methods of dewatering according to embodiments of the disclosure can be used in any suitable process where dewatering is useful. For example, in some embodiments, the methods of the disclosure have utility in relation to fermentation processes for the production of various chemicals and biofuels such as in the form of oxygenated products. By way of example, but not any limitation, the oxygenated product can be in the form of ethanol, butanol, butyrate, acetate, propanol, propionate, or any combination thereof. In addition, the method of dewatering can be used in other solid/liquid separation processes, such as where a filter press, belt press, centrifuge, or dryer device (such as a ring or spray dryer, etc.) is employed.

Embodiments of the methods of dewatering are not limited by the byproduct or the manner in which the byproduct is formed. The following description of fermentation is illustrative but not limiting inasmuch as it will be understood that variations are possible. Generally, the fermentation process occurs in a suitable bioreactor of any desirable size or type. In some embodiments, the bioreactor is industrial sized, having a capacity of, for example, tens of thousands, hundreds of thousands, or even a million liters or more. The bioreactor can be of any suitable type of design as will be understood in the art. The bioreactor can be in any suitable form, e.g., a tank with suitable mixing capability. In some embodiments, the bioreactor contains an agitator (e.g., an impeller) to facilitate mixing of the constituents added to the bioreactor. Alternatively, mixing can be achieved without an impeller by the pumping of liquid and/or the injection of gas into the bioreactor. For example, the tank can be cylindrical or other shape and the agitator (e.g., impeller) can be motor driven. For example, for gas fermentation, the bioreactor can be in the form of a continuously stirred tank reactor (CSTR), bubble column, air lift reactor, etc.

Ingredients including at least water, substrate gas, microorganism, nutrients, and vitamins are added to the bioreactor to form a fermentation broth therein to allow for the fermentation process. Each component can be delivered to the bioreactor in any suitable manner, e.g., via a recycled or new stream with the aid of a pump, gas nozzle, solid metering or other desired techniques. The water is useful as a transfer agent by delivering nutrients and other components. It is also well suited as a medium in the bioreactor as it can be readily stirred and allows for growth of organisms in a suspension while also accommodating subsequent separation of various components.

The substrate gas can be in the form of synthesis gas (syngas), which contains some combination of carbon monoxide (CO), carbon dioxide ($CO_2$), and/or hydrogen gas ($H_2$) in various proportions. In some embodiments, the substrate gas can be produced from coal, solid byproduct (e.g., biomass), plants, natural gas, municipal or industrial waste, or any combination thereof. For example, the syngas can be produced by the gasification of coal. The syngas can have any suitable ratio of carbon monoxide:hydrogen:carbon dioxide. The precise proportion of $CO:H_2:CO_2$ in the syngas will vary depending on the nature of its source and the type of process employed to produce the syngas.

The syngas is not limited to any particular e/C. As referred to herein, the e/C is a calculated ratio of the total number of electrons available for reaction as provided from syngas components, namely $H_2$ and CO, divided by the total moles of C-carbon in syngas. $H_2$ and CO each contain two electrons per molecule that are available for chemical reactions. $CO_2$ is included in the carbon balance but provides no electrons for chemical reactions. While $CH_4$ also contains 'C' and electrons, it is considered an inert compound in syngas fermentation and is therefore not included in e/C calculations. The e/C indicates hydrogen content in the gas mixture because hydrogen contributes electrons but carbon does not.

For example, in some embodiments the syngas can be hydrogen rich (e.g., as sourced from water gas shifted coal processes) such that the e/C is relatively high, such as from about 5.7 to about 8 in some embodiments, such as from about 5.7 to about 6 in some embodiments. However, in some embodiments, the syngas can be very high in carbon monoxide and/or carbon dioxide with small or no amounts of hydrogen (e.g., sourced from steel mill gases). For example, the syngas can have at least about a 1.8:1 or at least about a 2:1 ratio of carbon monoxide and/or carbon dioxide to hydrogen. Thus, in some embodiments the e/C can be relatively low such as from about 1 to about 3. In some embodiments, the ratio of carbon monoxide and/or carbon dioxide to hydrogen can be closer to 1:1 (e.g., from about 0.7:1 to about 1.3:1) and/or the e/C can be from about 3 to about 8.0, such as from about 3 to about 5.7.

In some embodiments, the syngas has an e/C of at least about 5.7, e.g., from about 5.7 to about 8.0. The $H_2$-enriched syngas can have any suitable e/C, e.g., an e/C from about 5.7 to 6.0, or from 5.7 to 6.1, or from 5.7 to 6.2, or from 5.7 to 6.3, or from 5.7 to 6.4, or from 5.7 to 6.5, or from 5.7 to 6.6, or form 5.7 to 6.7, or from 5.7 to 6.8, or from 5.7 to 6.9, or from 5.7 to 7.0, or from 5.7 to 7.1, or from 5.7 to 7.2, or from 5.7 to 7.3, or from 5.7 to 7.4, or from 5.7 to 7.5, or from 5.7 to 7.6, or from 5.7 to 7.7, or from 5.7 to 7.8, or from 5.7 to 7.9, or from 5.7 to 8.

Any suitable microorganism can be selected that is useful for the particularfermentation process. The precise microorganism may vary depending on the composition of the syngas and the product to be prepared, and embodiments of the disclosure are not limited to any particular microorganism or end-product from the fermentation. During fermentation, the microorganism generally functions to convert the substrate gas, e.g., in accordance with the Wood-Ljungdahl pathway into an oxygenated product, in addition to biomass. In this regard, carbon is provided by the CO and/or $CO_2$ in the syngas. Energy is provided by CO or $H_2$.

For example, in some embodiments the microorganism is in the form of bacteria, such as an acetogenic carboxydotroph. These bacteria are characterized as acetogenic carboxydotrophs. Such microorganisms are described in commonly-assigned co-pending U.S. Application Nos. 63/136,025 and 63/136,042, and International Patent Publication No. WO 2002/008438 A2, which are hereby incorporated by reference. In some embodiments, the microorganisms used in fermentation in the methods of the disclosure are in the form of bacteria comprising *Clostridium, Moorella, Pyrococcus, Eubacterium, Desulfobacterium, Carboxydothermus, Acetogenium, Acetobacterium, Acetoanaerobium, Butyribacterium, Peptostreptococcus*, or any combination thereof. However, the invention is not limited to use with any particular bacteria such that other suitable bacteria can be used as desired. For example, in some embodiments, suitable bacteria can be in the form of methanotrophs and/or methanogens, etc.

The nutrients and vitamins, as known in the art (as described in, e.g., U.S. Patent Application Nos. 63/136,025 and 63/136,042, which description of vitamins and nutrients are incorporated herein by reference) are beneficial to the fermentation process. Vitamins and nutrients are useful for cell growth and can be key levers to adjust the product distribution from the fermentation process as will be appreciated by one of ordinary skill in the art. For example, product distributions can be adjusted using selected combinations of vitamins. To illustrate, in some embodiments, if vitamin B5 is reduced then more ethanol can be produced but if more vitamin B1 is included, more biosolids can be produced. See, e.g., U.S. Pat. Nos. 7,285,402 B2 and 9,701,987 B2.

The amounts of each material added to the bioreactor vary depending on the fermentation scheme and can be readily determined by the person of ordinary skill in the art, and the invention is not limited by these amounts. In embodiments the amounts can be determined depending on the fermentation conditions, e.g., the makeup of the syngas, size of the bioreactor, content of nutrients and vitamins, etc.

Any suitable oxygenated product as desired can be prepared from the methods described herein. For example, in some embodiments, the oxygenated product is ethanol. In some embodiments, the oxygenated product is acetic acid, butyrate, butanol, propionate, propanol, or any combination thereof. The production of a particularly desired oxygenated product can be achieved by nutritional additions to the fermentation process, as will be appreciated by one of ordinary skill in the art. For example, acetogenic carboxydotroph microorganisms can make acetate in their natural state, but conditions can be manipulated to make ethanol. By way of example, the pH of the fermentation broth can be reduced to about 5.3 or less and the amount of vitamin B5 can be limited to allow for production of more ethanol (see, e.g., U.S. Pat. No. 7,285,402 B2). Other oxygenated compounds, such as propionate, butyrate, acetic acid, butanol, and propanol, can be made by engineering the acetogenic carboxydotroph microorganisms (see, e.g., U.S. Patent Publication 2011/0236941 A1), by the use of co-cultures (see, e.g., U.S. Pat. No. 9,469,860 B2 and U.S. Patent Publication 2014/0273123 A1) or addition or modification of components as will be within the level of skill of one of ordinary skill in the art. For example, the microorganism is engineered accordingly, or additional microorganisms are used.

After fermentation, the oxygenated product can be recovered from the broth in any suitable manner. For example, the oxygenated product can be separated from the broth by fractional distillation, evaporation, pervaporation, gas stripping, phase separation, extractive fermentation, including for example, liquid-liquid extraction, or any combination thereof. The solid byproduct can be derived from a solid separation unit as discussed herein before or after the removal of oxygenated compound. The recovered oxygen containing product can be packaged, stored, and transported, e.g., using train cars, trucks, or the like, to an end user such as for use as a biofuel or chemical. The biofuel can be used in mixtures of gasoline. Oxygenated compounds used as chemicals can have a variety of suitable uses as desired.

The resulting oxygenated compound-depleted broth contains solid byproduct and water. For example, in some embodiments, the solid byproduct is in the form of biomass containing, e.g., carbohydrates, proteins, nucleotides, and other heat stable components from a cell or on its surface, etc. The solid byproduct can have any suitable average particle size. The particles are often generally small (e.g., about 100 microns or less, e.g., about 0.1 microns to about 100 microns in average size). The particles generally are charged because of proteins and sugars on their exterior. The charge can be, for example, generally negatively charged. The oxygenated compound-depleted broth typically has a pH of about 6.0 or less (e.g., from about 4 to about 5).

In accordance with embodiments of the disclosure, it has been found that, surprisingly and unexpectedly, a particular sequence of chemical treatment is useful for the dewatering method by conditioning the solid byproduct. In particular, the solid byproduct is treated with alkaline material to increase the pH of the solid byproduct (in water) to a value of about 7 to about 8.5 (e.g., from about 7.5 to about 8.1). Next, coagulant is added to the solid byproduct in water to reduce the net charge on the particles (e.g., by up to about 99%, such as up to about 95%, such as from about 85% to about 99%). Then, agglomerating polymer is added to increase the average size of the particles as desired (e.g., to at least about 1 mm). It has been found that, surprisingly and unexpectedly, the particular sequence of alkaline material, coagulant, and agglomerating polymer is beneficial for efficient dewatering.

Any suitable technique can be used for separating the chemically treated solid byproduct from the water in accordance with embodiments of the disclosure. For example, known technologies such as a screw press, belt press, filter press, centrifuge, and dryer can be used to dewater the conditioned (pre-treated) byproduct. In preferred embodiments, higher concentrated solids are generated in the resulting cake, which is separated from the clarified stream filtrate. It has been found that, surprisingly and unexpectedly, by conditioning the byproduct in the sequence described herein, the dewatering potential is enhanced by increasing higher throughput capacity and minimizing cleaning frequencies.

In some embodiments, the recovered solid byproduct can be used as animal feed and/or land use applications. For example, the resulting cake can be effective for landfill application (e.g., to Class A solids), land application as fertilizer, or feed for animals, such as aquatic culture (fish feed), poultry feed, cattle feed, hog feed, etc. In the case of fish feed, advantageously, in some embodiments, the fish feed contains less total toxic metals as compared with conventional fish meal.

In some embodiments, the cake contains about 25 to about 50 wt. % solids, such as about 25 to about 40 wt. % solids. The amount of recovered solids is advantageous because it contains protein, carbohydrates, minerals, and potentially vitamins of nutritional value for plants and animals.

The cake can be used wet or dry. For example, in some embodiments, the cake is effective for use as a wet fertilizer. In some embodiments, the method further comprises drying the cake and the dried cake is effective for use as dry fertilizer, animal feed or fish feed, or any combination thereof.

The respective compositions of the animal feed and fertilizer are generally similar because they are mainly composed of microbial proteins and/or carbohydrates. In some embodiments, the animal feed and/or fertilizer contains protein (e.g. from about 30 wt. % to about 90 wt. %, such as from about 60 wt. % to about 90 wt. %), fat (e.g. from about 1 wt. % to about 12 wt. %, such as from about 1 wt. % to about 3 wt. %), carbohydrate (e.g. from about 5 wt. % to about 60 wt. %, such as from about 15 wt. % to about 60 wt. %, or from about 5 wt. % to about 15 wt. %) and/or minerals such as sodium, potassium, copper etc. (e.g. from about 1 wt. % to about 20 wt. %, such as from about 1 wt. % to about 3 wt. %). For example, the animal feed and/or fertilizer can contain about 86% protein, about 2% fat, about 2% minerals, and about 10% carbohydrate.

The clarified stream filtrate contains water and residual solids. In some embodiments, the clarified stream contains about 1000 ppm or less of total suspended solids, e.g., from about 50 ppm to about 1000 ppm of total suspended solids, from about 50 ppm to about 500 ppm of total suspended solids, or from about 50 ppm to about 250 ppm of total suspended solids, etc. In some embodiments, the clarified stream is sent for wastewater treatment. While not cost effective because of the small quantity of the water, if desired, the water can be recycled back into the liquid medium in the bioreactor for use in fermentation to produce additional product. Thus, the methods according to the disclosure provide significant advantages such as the possibility for improving the efficiency of conditioning, dewatering, and drying.

FIG. 1 schematically illustrates the dewatering of solid byproduct in accordance with embodiments of the disclosure. A dewatering process 10 is shown. The solid byproduct 12 containing solid particles (e.g., biomass) in water is added to a pretreatment tank 14. An alkaline material such as lime and/or sodium hydroxide 16 is added to tank 14. Lime is in the form of calcium hydroxide, or in some cases calcium oxide. A coagulant 18 and agglomerating polymer 20, respectively, are added to the tank 14. Each of the materials used in the chemical treatment 16, 18, and 20 can be added in any suitable manner, such as via pump (not shown) (e.g., lime and/or sodium hydroxide followed by coagulant followed by polymer). After pretreatment, the solid byproduct in water is delivered to a diaphragm pump 22 so that it can be pumped to a dewatering device such as a filter press 24. The solid particles and water are separated into a cake containing biosolid 26 and filtrate 28, which can be recovered separately. The filtrate 28 can be sent to a wastewater treatment tank for further biological treatment. The cake 26 can be used as desired, e.g., for landfill applications and/or fertilizer for land application, and/or animal feed (e.g., poultry feed or aquatic animal feed).

Alkaline Material

The solid byproduct in water is treated with alkaline material prior to addition of coagulant and agglomerating polymer, respectively. The solid byproduct contains particles that are generally charged because the particles have a surface charge associated with them, typically negative, e.g., due to the presence of negatively charged components, such as, but not limited to, polysaccharides and proteins. When the particles with like surface charge are brought close together, they repel each other and do not aggregate. Negatively (surface) charged particles attract positive counterions on and near the particle surface to satisfy electroneutrality. The solid byproduct particles thus tend to exhibit stickiness. The stickiness refers to specific resistance to filtration. The alkaline material is selected and provided in an amount to effectively decrease stickiness of the particles in the solid byproduct. By reducing the charge, the alkaline materials reduces the repulsion of the particles. While not wishing to be bound by any particular theory, it is believed that the alkaline material promotes particle collisions to increase the aggregation of the solid particle. It is further believed that the alkaline material is useful to stabilize ions, which means that it enhances the conditioning and reduces resistance to filtration. In this regard, the alkaline material is added to increase the pH of the solid byproduct to a suitable value, such as from about 7 to about 8.5 (e.g., from about 7.5 to about 8.1). Thus, alkaline material is desirably added to stabilize charged particles and produce suitable pH prior to the addition of coagulant and agglomerating polymer. The alkaline material enhances the chemical treatment process by enhancing the stabilization process to help significantly neutralize charged particles to generate a relatively non-sticky filter cake.

Any suitable alkaline material (e.g. containing monovalent or divalent cations) can be used to increase the pH of the solid byproduct in water. In some embodiments, the alkaline material is an aqueous solution of lime, sodium hydroxide, soda ash, or any combination thereof. In some embodiments, the alkaline material comprises spent sodium hydroxide (NaOH), such as from a pasteurization step for clean in place (CIP) cleaning. For example, material spent from the CIP cleaning can be from any portion of the equipment used in the fermentation process (such as the bioreactor, media feed, recycle loop, heat exchangers, distillation, and/or storage (beer well), etc.).

In some embodiments, fermentation and/or downstream processing equipment is pasteurized. The pasteurization can take place using any suitable steps, such as CIP systems. For example, in some embodiments, the pasteurization comprises the steps of an initial flush with clean water, a caustic (sodium hydroxide) wash, and a final rinse with clean water. The initial flush targets the removal of large solid residue from the tank. The water used in this step is then sent to waste treatment as it contains solids. After the initial flush, the tank is cleaned by means of the sodium hydroxide wash, which is hot and diluted (about ~3-5%). A divalent solution chemically is a solution from alkaline earth metals containing cations with a valence of two. A divalent solution can be used as an alkaline material because it neutralizes and stabilizes alkalinity of the solution. Examples of a divalent solution include calcium hydroxide (hydrated lime), magnesium hydroxide, and sodium carbonate (soda ash). Once the sodium hydroxide wash step is completed, the sodium hydroxide solution used in the wash is then returned to the sodium hydroxide solution tank. The sodium hydroxide solution is used in multiple washes until the concentration depletes below 2%, at which point a small portion of the depleted sodium hydroxide solution is purged and used to adjust the pH for the dewatering process. The spent sodium hydroxide solution does not contain any water from the initial or final flushes. After the sodium hydroxide wash step, the tank is then subjected to the final rinse with clean water to remove any remaining sodium hydroxide solution in the tank. The water used in this final flush step is then sent to the tank containing the water used in the initial flush for use in future CIP cleanings.

The alkaline material can be in any suitable aqueous solution. In some embodiments, the alkaline material is an aqueous solution of lime, the solution containing from about 20 g to about 40 g of 2 wt. % of lime, such as from about 0.4 g to about 0.8 g of 100 wt. % of lime. In some embodiments, the alkaline material is an aqueous solution of sodium hydroxide, the solution containing from about 1 g to about 2 g of 40 wt. % of sodium hydroxide, such as from about 0.3 g to about 0.6 g of 100 wt. % of sodium hydroxide. In some embodiments, the alkaline material is an aqueous solution of soda ash, the solution containing from about 35 g to about 70 g of 2 wt. % of soda ash, such as from about 0.5 g to about 1 g of 100 wt. % of soda ash.

A dosage rate refers to the amount of material (such as alkaline material) per pound of solid byproduct on a solids/solids basis. In some embodiments, the alkaline material is added at a dosage rate of, e.g., from about 0.3 g to about 1 g of alkaline material per pound of solid byproduct on a weight/weight basis. In some embodiments, the alkaline material is lime added at a dosage rate of, e.g., from about 0.4 g to about 0.8 g of lime. In some embodiments, the alkaline material is sodium hydroxide (whether spent from the CIP process or otherwise) added at a dosage rate of, e.g., from about 0.3 g to about 0.6 g of sodium hydroxide. In some embodiments, the alkaline material is soda ash added at a dosage rate of, e.g., from about 0.5 g to about 1.0 g of soda ash per pound of solid byproduct.

Coagulant

After treatment with the alkaline material, coagulation is useful to completely stabilize and neutralize the charged particles. This stabilization and neutralization is beneficial because it produces pin flocs (e.g., generally having an average size of from about 5 microns to about 50 microns) that can be agglomerated into larger flocs after addition of flocculant (where the agglomerated solids generally have an average particle size of greater than 50 microns, e.g., from about 1 to about 10 mm). It has been found that, surprisingly and unexpectedly, the use of the alkaline material and then coagulant is beneficial to promote stabilization and neutralization and thereby improve dewatering by reducing resistance for filtration (stickiness).

Generally, the coagulant chemically has cationic (positive) or anionic (negative) charged metal ions. For example, in some embodiments, the coagulant is an aluminum chlorohydrate with cationic aluminum charged ions, dimethylamine epichlorohydrin copolymer cationic charged ions rated as Generally Recognized as Safe (GRAS), aluminum sulfate (alum), polyaluminum chloride (PAC), ferric chloride, ferric sulfate, ferrous sulfate, polyamine with cationic charged ions, or any combination thereof. In some embodiments, the coagulant is an aluminum chlorohydrate (ACH) with cationic aluminum charged ions, dimethylamine epichlorohydrin copolymer with cationic charged ions, or any combination thereof.

The coagulant can be added in the form of a solution. The solution can have any suitable concentration of the coagulant in water. For example, in some embodiments, the coagulant is added in an aqueous solution containing from about 1 to about 10 wt. % of coagulant. The coagulant can be added to the solid byproduct at any suitable dosage rate. In some embodiments, the coagulant solution is added at a dosage rate of from about 0.5 g to about 2 g of the coagulant per pound of solid byproduct on a weight/weight basis.

Agglomerating Polymer

After coagulation, an agglomerating polymer is added to the solid byproduct. The agglomerating polymer is selected as a flocculant to promote particle collisions to form larger particles that settle or filter readily in dewatering. The agglomerating polymer is selected to form agglomerates having an average size of at least 50 microns (e.g., at least about 1 mm, such as from about 1 mm to about 10 mm). Flocs refer to chemically conditioned and agglomerated particles that can be more easily dewatered. These larger particles have been found to be more easily separated in dewatering since they can be captured by filter systems with appropriate pore size rating. In addition, because of the prior addition of alkaline material and coagulant, the nature of the agglomerates is non-sticky solids, which makes them more robust for dewatering because they are filterable. This is advantageous because it reduces maintenance cost to clean filters and increases the higher throughput capacity to treat with any dewatering system.

In some embodiments, the agglomerated polymer generally has a high molecular weight and is highly cationically or anionically charged (e.g., containing about 20-40% anionic or cationic concentration of charged particles). In some embodiments, the polymer is a water soluble anionic polymer containing distillates, petroleum, hydrotreated light or cationic emulsion based on polyacrylamide, containing less than 50% polymer with 2-propenamide; cationic water-soluble polymer in emulsion containing distillates; petroleum, hydrotreated light; cationic emulsion based on polyacrylamide containing 20-50% (w/w) ethanaminium,N,N,N-trimethyl-2-chloride, polymer with 2-propenamide and 20-50% (w/w) distillates, hydrated light; cationic water-soluble polymer in emulsion containing 20-30% (w/w) distillates, petroleum, hydrated light and less than 5% (w/w) poly(oxy-1,2-ethanediyl), a-tridecyl-w-hydroxy-branched or cationic water soluble polymer in emulsion; water dispersible ultra high molecular weight cationic polymer containing adipic acid, water soluble ultra high molecular weight cationic polymer, water dispersible high molecular weight cationic polymer, water soluble very high molecular weight anionic polymer or any combination thereof. In some embodiments, the agglomerating polymer is a water-soluble anionic polymer containing distillates; petroleum, hydrotreated light; cationic emulsion based on polyacrylamide containing less than 50% polymer with 2-propenamide; cationic water-soluble polymer in emulsion containing distillates, petroleum, hydrotreated light; and/or any combination thereof.

The agglomerating polymer can be added in the form of an aqueous solution having any suitable concentration. In some embodiments, the polymer is added in an aqueous solution containing from about 10 g to about 80 g of 0.5 wt. % of polymer, or from about 0.05 g to about 0.4 g of 100 wt. % of polymer. The agglomerating polymer can be added at any suitable dosage rate. For example, in some embodiments, the agglomerating polymer solution is added at a dosage rate of from about 20 g to about 80 g of 0.5 wt. % polymer per pound of solid byproduct, e.g., a dosage rate of from about 0.1 g to about 0.4 g of 100 wt. % polymer per pound of solid byproduct on a weight/weight basis.

Separating the Agglomerated Solid Byproduct from the Water

The agglomerated solid byproduct can be separated from the water by any suitable technique, such as, for example, centrifugation, membrane separation, screw press, plate and frame filter press, membrane filter press, or any combination thereof.

To illustrate, in some embodiments, a filter press can be used. The aqueous slurry of agglomerated solid byproduct is passed through a filter material having a rating of from about 1 micron to about 30 microns, such as from about 1 micron to about 10 microns (e.g., about 5 microns). In some embodiments, the filter is woven. The filtration can occur via a filter press under pressure (such as a pressure of from about 0 to about 200 psi). In some embodiments, the filtration step occurs for a period of from about 1 hour to about 3 hours per 33 pounds of solid byproduct containing 5 wt. % solid per 1.7 square feet of filtration area, e.g., from about 1 hour to about 2 hours per 33 pounds of solid byproduct containing 5 wt. % solid per 1.7 square feet of filtration area. In some embodiments, the pressure increases in step sequence from about 0 psi to about 100 psi. In some embodiments, the pressure is increased from about 0 psi to about 20 psi to about 40 psi to about 60 psi to about 80 psi to about 100 psi, wherein the pressure is applied in total for about 1 to 3 hours per 33 pounds solid byproduct at 1.7 square feet of filtration area. However, it will be understood that the foregoing parameters are merely illustrative and one of ordinary skill in the art can use alternate settings and time. In some embodiments, the pressure is applied in a dewatering or pressing units such as filter press, membrane press, belt press, and/or screw press.

Aspects

The invention is further illustrated by the following exemplary aspects. However, the invention is not limited by the following aspects.

(1) A method of dewatering solid byproduct comprising: (a) providing a solid byproduct containing water and solid particles; (b) treating the solid byproduct with alkaline material effective to increase pH of the solid byproduct to a value of from about 7 to about 8.5 (e.g., from about 7.5 to about 8.1); (c) adding coagulant to the alkaline-treated solid byproduct, the coagulant effective to reduce net charge of the particles; (d) adding polymer to the solid byproduct with reduced net charge, the polymer effective to agglomerate the particles so they have an average particle size of at least about 1 mm (e.g., from about 1 mm to about 10 mm); and (e) removing the agglomerated solid byproduct particles to produce a cake and a clarified stream filtrate.

(2) The method of aspect 1, wherein the solid byproduct results from fermentation of substrate gas for production of an oxygenated compound.

(3) The method of aspect 2, wherein the substrate gas is a syngas comprising at least two of the following components: $CO$, $CO_2$, and $H_2$.

(4) The method of aspects 2 or 3, wherein the oxygenated compound is ethanol, butanol, butyrate, acetate, propanol, propionate, or any combination thereof.

(5) The method of any one of aspects 2-4, wherein the oxygenated compound is ethanol.

(6) The method of any one of aspects 2-5, wherein the substrate gas is produced from coal, biomass, plants, natural gas, municipal or industrial waste, or any combination thereof.

(7) The method of aspect 6, wherein the substrate gas is produced from gasification of coal, and the solid byproduct comprises biomass.

(8) The method of any one of aspects 1-7, wherein the cake is effective for landfill application or land application as fertilizer or animal feed.

(9) The method of any one of aspects 2-5, further comprising removal of oxygenated compound, wherein the solid byproduct is derived from solid separation unit before or after the removal of oxygenated compound.

(10) The method of any one of aspects 1-9, wherein the alkaline material is an aqueous solution of lime, sodium hydroxide, soda ash, or any combination thereof.

(11) The method of any one of aspects 1-10, wherein the alkaline material is added at a dosage rate of from about 0.4 g to about 0.8 g of lime or from about 0.3 g to about 0.6 g of sodium hydroxide, or from about 0.5 g to about 1.0 g of soda ash per pound of solid byproduct, e.g., a dosage rate of from about 0.3 g to about 1 g of alkaline material per pound of solid byproduct on a weight/weight basis.

(12) The method of any one of aspects 1-11, wherein the alkaline material is an aqueous solution of lime, the solution containing from about 20 g to about 40 g of 2 wt. % of lime, such as from about 0.4 g to about 0.8 g of 100 wt. % of lime.

(13) The method of any one of aspects 1-11, wherein the alkaline material is an aqueous solution of sodium hydroxide, the solution containing from about 1 g to about 2 g of 40 wt. % of sodium hydroxide, such as from about 0.3 g to about 0.6 g of 100 wt. % of sodium hydroxide.

(14) The method of any one of aspects 1-11, wherein the alkaline material is an aqueous solution of soda ash, the solution containing from about 35 g to about 70 g of 2 wt. % of soda ash, such as from about 0.5 g to about 1 g of 100 wt. % of soda ash.

(15) The method of any one of aspects 1-14, the coagulant characterized as chemically having cationic (positive) or anionic (negative) charged metal ions.

(16) The method of aspect 15, wherein the coagulant is an aluminum chlorohydrate with cationic aluminum charged ions or dimethylamine epichlorohydrin copolymer cationic charged ions rated as GRAS or aluminum sulfate (alum), or polyaluminum chloride (PAC), ferric chloride, ferric sulfate, ferrous sulfate, polyamine with cationic charged ions, or any combination thereof, preferably an aluminum chlorohydrate (ACH) with cationic aluminum charged ions or dimethylamine epichlorohydrin copolymer with cationic charged ions, or any combination thereof.

(17) The method of any one of aspects 1-16, wherein the coagulant is added in an aqueous solution, the solution containing from about 1 wt. % to about 10 wt. % of coagulant.

(18) The method of any one of aspects 1-17, wherein the coagulant solution is added at a dosage rate of from about 0.5 g to about 2 g per pound of solid byproduct on a weight/weight basis.

(19) The method of any one of aspects 1-18, the polymer being highly charged (e.g., containing about 20-40% anionic or cationic concentration of charged particles).

(20) The method of aspect 19, wherein the polymer is a water soluble anionic polymer containing distillates, petroleum, hydrotreated light or cationic emulsion based on polyacrylamide with containing less than 50% polymer with 2-propenamide, or cationic water-soluble polymer in emulsion containing distillates, petroleum, hydrotreated light, or cationic emulsion based on polyacrylamide containing 20-50% (w/w) ethanaminium,N,N,N-trimethyl-2-chloride, polymer with 2-propenamide and 20-50% (w/w) distillates, hydrated light, or cationic water-soluble polymer in emulsion containing 20-30% (w/w) distillates, petroleum, hydrated light and less than 5% (w/w) poly(oxy-1,2-ethanediyl), a-tridecyl-w-hydroxy-, branched or cationic water soluble polymer in emulsion, or any combination thereof, preferably a water soluble anionic polymer containing distillates, petroleum, hydrotreated light or cationic emulsion based on polyacrylamide with containing less than 50% polymer with 2-propenamide, or cationic water-soluble polymer in emulsion containing distillates, petroleum, hydrotreated light, water dispersible ultra high molecular weight cationic polymer containing adipic acid, water soluble ultra high molecular weight cationic polymer, water dispersible high molecular weight cationic polymer, water soluble very high molecular weight anionic polymer, or any combination thereof.

(21) The method of any one of aspects 1-16, wherein the polymer is added in an aqueous solution, the solution containing from about 10 g to about 80 g of 0.5 wt. % of polymer, such as from about to about 0.05 g to about 0.4 g of 100 wt. % of polymer.

(22) The method of any one of aspects 1-17, wherein the polymer solution is added at a dosage rate of from about 10 g to about 80 g of 0.5 wt. % polymer per pound of solid byproduct, e.g., a dosage rate of from about 0.05 g to about 0.4 g 100 wt. % polymer per pound of solid byproduct on a weight/weight basis.

(23) The method of any one of aspects 1-22, wherein the removing the agglomerated solid byproduct comprises filtering through a filter material having a rating of from about 1 micron to about 30 microns, such as from about 1 micron to about 10 microns (e.g., about 5 microns).

(24) The method of aspect 23, wherein the filter is woven.

(25) The method of aspects 23 or 24, wherein the filtration occurs via a filter press under pressure (such as a pressure of from about 0 to about 200 psi).

(26) The method of aspect 25, where the filtration step occurs for a period of from about 1 hour to about 3 hours per 33 pounds of solid byproduct containing 5 wt. % solid per 1.7 square feet of filtration area, e.g., from about 1 hour to about 2 hours per 33 pounds of solid byproduct containing 5 wt. % solid per 1.7 square feet of filtration area.

(27) The method of aspects 25 or 26, wherein the pressure increases in step sequence from about 0 psi to about 100 psi.

(28) The method of aspect 27, wherein the pressure is increased from about 0 psi to about 20 psi to about 40 psi to about 60 psi to about 80 psi to about 100 psi, wherein the pressure is applied in total for about 1 to about 3 hours per 33 pounds solid byproduct at 1.7 square feet of filtration area.

(29) The method of any one of aspects 25-28, wherein the pressure is applied in a dewatering or pressing units such as filter press or membrane press or belt press or screw press.

(30) The method of any one of aspects 1-29, wherein the cake contains about 25 to about 50 wt. % solids, such as about 25 to about 40 wt. % solids.

(31) The method of any one of aspects 1-30, wherein the alkaline material comprises spent sodium hydroxide, such as from a sanitization steps for CIP cleaning, the sanitization step comprising the steps of initial flush with clean water, sodium hydroxide clean and final rinse with clean water.

(32) A continuous method of making an oxygenated compound such as ethanol, butanol, butyrate, acetate, propanol, propionate, or any combination thereof, the method comprising: (a) providing substrate gas comprising at least two of the following: CO, $CO_2$, and $H_2$; (b) fermenting the substrate gas in a bioreactor with bacteria in a liquid medium to produce a broth including oxygenated product, water, and solid byproduct; (c) removing the oxygenated product from the broth to produce an oxygenated product-depleted broth; (d) separating a solid byproduct from the broth and/or the oxygenated product-depleted broth, the solid byproduct containing water and solid particles; (e) treating the solid byproduct with alkaline material effective to increase pH of the solid byproduct to a value of from about 7 to about 8.5 (e.g., from about 7.5 to about 8.1); (f) adding coagulant to the alkaline-treated solid byproduct, the coagulant effective to reduce net charge of the particles; (g) adding polymer to the solid byproduct with reduced net charge, the polymer effective to agglomerate the particles so they have an average particle size of at least about 1 mm (e.g., from about 1 mm to about 10 mm); and (h) removing the agglomerated solid byproduct particles to produce a cake and a clarified stream filtrate.

(33) The method of aspect 32, the bacteria comprising *Clostridium, Moorella, Pyrococcus, Eubacterium, Desulfobacterium*, Carboxvdothermus, *Acetogenium, Acetobacterium, Acetoanaerobium*, Butyribacterium, *Peptostreptococcus*, or any combination thereof.

(34) The method of aspects 32 or 33, wherein the clarified stream contains about 500 ppm or less of total suspended solids, e.g., from about 50 ppm to about 1000 ppm of total suspended solids.

(35) The method of any one of aspects 32-34, wherein the clarified stream is sent to wastewater treatment.

(36) The method of any one of aspects 32-35, wherein the solid byproduct is separated by centrifugation, membrane separation, screw press, plate and frame filter press, membrane filter press, or any combination thereof.

(37) The method of any one of aspects 32-36, wherein the oxygenated product is removed by fractional distillation, evaporation, pervaporation, gas stripping, phase separation, and extractive fermentation, including for example, liquid-liquid extraction, or any combination thereof.

(38) The method of any one of aspects 32-37, wherein the cake is effective for use as a wet fertilizer.

(39) The method of any one of aspects 32-38, wherein the cake is dried and the dried cake is effective for use as dry fertilizer, animal feed, or any combination thereof.

(40) The method of any one of aspects 32-39, wherein the alkaline material comprises spent sodium hydroxide, such as from a sanitization step for CIP cleaning, the sanitization comprising the steps of initial flush with clean water, sodium hydroxide clean and final rinse with clean water.

(41) The method of any one of aspects 32-40, wherein the substrate gas is produced from coal, biomass, plants, natural gas, municipal or industrial waste, or any combination thereof.

(42) The method of aspect 41, wherein the substrate gas is produced from gasification of coal, and the solid byproduct comprises biomass.

(43) The method of any one of aspects 32-42, further comprising removal of oxygenated compound, wherein the solid byproduct is derived from a solid separation unit before or after the removal of oxygenated compound.

(44) The method of any one of aspects 32-43, wherein the alkaline material is an aqueous solution of lime, sodium hydroxide, soda ash, or any combination thereof.

(45) The method of any one of aspects 32-44, wherein the alkaline material is added at a dosage rate of from about 0.4 g to about 0.8 g of lime or from about 0.3 g to about 0.6 g of sodium hydroxide, or from about 0.5 g to about 1.0 g of soda ash per pound of solid byproduct, e.g., a dosage rate of from about 0.3 g to about 1 g of alkaline material per pound of solid byproduct on a weight/weight basis.

(46) The method of any one of aspects 32-45, wherein the alkaline material is an aqueous solution of lime, the solution containing from about 20 g to about 40 g of 2 wt. % of lime, such as from about 0.4 g to about 0.8 g of 100 wt. % of lime.

(47) The method of any one of aspects 32-45, wherein the alkaline material is an aqueous solution of sodium hydroxide, the solution containing from about 1 g to about 2 g of 40 wt. % of sodium hydroxide, such as from about 0.3 g to about 0.6 g of 100 wt. % of sodium hydroxide.

(48) The method of any one of aspects 32-45, wherein the alkaline material is an aqueous solution of soda ash, the solution containing from about 35 g to about 70 g of 2 wt. % of soda ash, such as from about 0.5 g to about 1 g of 100 wt. % of soda ash.

(49) The method of any one of aspects 32-48, the coagulant characterized as chemically having cationic (positive) or anionic (negative) charged metal ions.

(50) The method of aspect 49, wherein the coagulant is an aluminum chlorohydrate with cationic aluminum charged ions or dimethylamine epichlorohydrin copolymer cationic charged ions rated as GRAS or aluminum sulfate (alum), or polyaluminum chloride (PAC), ferric chloride, ferric sulfate, ferrous sulfate, polyamine with cationic charged ions, or any combination thereof, preferably an aluminum chlorohydrate (ACH) with cationic aluminum charged ions or dimethylamine epichlorohydrin copolymer with cationic charged ions, or any combination thereof.

(51) The method of any one of aspects 32-50, wherein the coagulant is added in an aqueous solution, the solution containing from about 1 to about 10 wt. % of coagulant.

(52) The method of any one of aspects 32-51, wherein the coagulant solution is added at a dosage rate of from about 0.5 g to about 2 g per pound of solid byproduct on a weight/weight basis.

(53) The method of any one of aspects 32-52, the polymer is highly charged (e.g., containing about 20-40% anionic or cationic concentration of charged particles) (e.g., in an amount of about 10 g to about 80 g of 0.5 wt. % polymer, such as from about 0.05 g to about 0.4 g of 100 wt. % polymer.

(54) The method of aspect 53, wherein the polymer is a water soluble anionic polymer containing distillates, petroleum, and/or hydrotreated light; cationic emulsion based on polyacrylamide with containing less than 50% polymer with 2-propenamide; cationic water-soluble polymer in emulsion containing distillates, petroleum, hydrotreated light; cationic emulsion based on polyacrylamide containing 20-50% (w/w) ethanaminium,N,N,N-trimethyl-2-chloride; polymer with 2-propenamide and 20-50% (w/w) distillates, petroleum, hydrotreated light; cationic water-soluble polymer in emulsion containing 20-30% (w/w) distillates, petroleum, hydrated light; less than 5% (w/w) poly(oxy-1,2-ethanediyl), a-tridecyl-w-hydroxy-branched or cationic water soluble polymer in emulsion; water dispersible ultra high molecular weight cationic polymer containing adipic acid; water soluble ultra high molecular weight cationic polymer; water dispersible high molecular weight cationic polymer; water soluble very high molecular weight anionic polymer; or any combination thereof.

(55) The method of any one of aspects 32-52, wherein the polymer is added in an aqueous solution, the solution containing from about 10 g to about 80 g of 0.5 wt. % of polymer, such as from about 0.05 g to about 0.4 g of 100 wt. % of polymer.

(56) The method of any one of aspects 32-53, wherein the polymer solution is added at a dosage rate of from about 10 g to about 80 g of 0.5 wt. % polymer per pound of solid byproduct, e.g., a dosage rate of from about 0.05 g to about 0.4 g of 100 wt. % polymer per pound of solid byproduct on a weight/weight basis.

(57) The method of any one of aspects 32-56, wherein the removing the agglomerated solid byproduct comprises filtering through a filter material having a rating of from about 1 micron to about 30 microns, such as from about 1 micron to about 10 microns (e.g., about 5 microns).

(58) The method of aspect 57, wherein the filter is woven.

(59) The method of aspects 57 or 58, wherein the filtration occurs via a filter press under pressure (such as a pressure of from about 0 to about 200 psi).

(60) The method of aspect 59, where the filtration step occurs for a period of from about 1 hour to about 3 hours per 33 pounds of solid byproduct containing 5 wt. % solid per 1.7 square feet of filtration area, e.g., from about 1 hour to about 2 hours per 33 pounds of solid byproduct containing 5 wt. % solid per 1.7 square feet of filtration area.

(61) The method of aspects 59 or 60, wherein the pressure increases in step sequence from about 0 psi to about 100 psi.

(62) The method of aspect 61, wherein the pressure is increased from about 0 psi to about 20 psi to about 40 psi to about 60 psi to about 80 psi to about 100 psi, wherein the pressure is applied for about 1 hour to about 3 hours per 33 pounds solid byproduct at 1.7 square feet of filtration area.

(63) The method of any one of aspects 59-62, wherein the pressure is applied in a dewatering or pressing units such as filter press or membrane press or belt press or screw press.

(64) The method of any one of aspects 32-63, wherein the cake contains about 25 to about 50 wt. % solids, such as about 25 to about 40 wt. % solids.

(65) A method of preparing fertilizer, the method comprising: (a) providing gaseous substrate comprising at least two of the following $H_2$, CO, and $CO_2$; (b) fermenting the gaseous substrate in a bioreactor with bacteria in a liquid medium to produce a broth including an oxygenated product, water, and solid byproduct; (c) removing the oxygenated product from the broth to produce an oxygen product-depleted broth; (d) separating a solid byproduct from the broth and/or the oxygenated product-depleted broth, the solid byproduct containing solid particles; (e) treating the solid byproduct with alkaline material effective to increase pH of the solid byproduct to a value of from about 7 to about 8.5 (e.g., about 7.5 to about 8.1); (f) adding coagulant to the alkaline-treated solid byproduct, the coagulant effective to reduce the net charge of the particles; (g) adding polymer to the solid byproduct with reduced net charge, the polymer effective to agglomerate the particles so they have an average particle size of at least about 1 mm (e.g., from about 1 mm to about 10 mm); and (h) removing the agglomerated solid byproduct particles to produce a cake and a clarified stream filtrate, the cake being effective for use as fertilizer.

(66) The method of aspect 65, further comprising drying the cake, the dried cake effective as a dry fertilizer.

(67) The method of aspect 65 or 66, wherein the fertilizer contains protein, fat, carbohydrate, and/or minerals, e.g., 86% protein, 2% fat, 2% minerals, 10% carbohydrate.

(68) The method of any one of aspects 65-67, wherein the alkaline material comprises spent sodium hydroxide, such as from a sanitization step for CIP cleaning, the sanitization comprising the steps of initial flush with clean water, sodium hydroxide clean and final rinse with clean water.

(69) The method of any one of aspects 66-68, wherein the substrate gas is produced from coal, biomass, plants, natural gas, municipal or industrial waste, or any combination thereof.

(70) The method of aspect 69, wherein the substrate gas is produced from gasification of coal, and the solid byproduct comprises biomass.

(71) The method of any one of aspects 65-70, wherein the alkaline material is an aqueous solution of lime, sodium hydroxide, soda ash, or any combination thereof.

(72) The method of any one of aspects 65-71, wherein the alkaline material is added at a dosage rate of from about 0.4 g to about 0.8 g of lime or from about 0.3 g to about 0.6 g of sodium hydroxide, or from about 0.5 g to about 1.0 g of soda ash per pound of solid byproduct, e.g., a dosage rate of from about 0.3 g to about 1 g of alkaline material per pound of solid byproduct on a weight/weight basis.

(73) The method of any one of aspects 65-72, wherein the alkaline material is an aqueous solution of lime, the solution containing from about 20 g to about 40 g of 2 wt. % of lime, such as from about 0.4 g to about 0.8 g of 100 wt. % of lime.

(74) The method of any one of aspects 65-72, wherein the alkaline material is an aqueous solution of sodium hydroxide, the solution containing from about 1 g to about 2 g of 40 wt. % of sodium hydroxide, such as from about 0.3 g to about 0.6 g of 100 wt. % of sodium hydroxide.

(75) The method of any one of aspects 65-72, wherein the alkaline material is an aqueous solution of soda ash, the solution containing from about 35 g to about 70 g of 2 wt. % of soda ash, such as from about 0.5 g to about 1 g of 100 wt. % of soda ash.

(76) The method of any one of aspects 65-75, the coagulant characterized as chemically having cationic (positive) or anionic (negative) charged metal ions.

(77) The method of aspect 76, wherein the coagulant is an aluminum chlorohydrate with cationic aluminum charged ions or dimethylamine epichlorohydrin copolymer cationic charged ions rated as GRAS or aluminum sulfate (alum), or polyaluminum chloride (PAC), ferric chloride, ferric sulfate, ferrous sulfate, polyamine with cationic charged ions, or any combination thereof, preferably an aluminum chlorohydrate (ACH) with cationic aluminum charged ions or dimethylamine epichlorohydrin copolymer with cationic charged ions, or any combination thereof.

(78) The method of any one of aspects 65-77, wherein the coagulant is added in an aqueous solution, the solution containing from about 1 wt. % to about 10 wt. % of coagulant.

(79) The method of any one of aspects 65-78, wherein the coagulant solution is added at a dosage rate of from about 0.5 g to about 2 g per pound of solid byproduct on a weight/weight basis.

(80) The method of any one of aspects 65-79, the polymer is highly charged (e.g., containing about 20-40% anionic or cationic concentration of charged particles).

(81) The method of aspect 80, wherein the polymer is a water soluble anionic polymer containing distillates, petroleum, hydrotreated light or cationic emulsion based on polyacrylamide with containing less than 50% polymer with 2-propenamide, or cationic water-soluble polymer in emulsion containing distillates, petroleum, hydrotreated light, or cationic emulsion based on polyacrylamide containing 20-50% (w/w) ethanaminium,N,N,N-trimethyl-2-chloride, polymer with 2-propenamide and 20-50% (w/w) distillates, hydrated light, or cationic water-soluble polymer in emulsion containing 20-30% (w/w) distillates, petroleum, hydrated light and less than 5% (w/w) poly(oxy-1,2-ethanediyl), a-tridecyl-w-hydroxy-branched or cationic water soluble polymer in emulsion, or any combination thereof, preferably a water soluble anionic polymer containing distillates, petroleum, hydrotreated light or cationic emulsion based on polyacrylamide with containing less than 50% polymer with 2-propenamide, or cationic water-soluble polymer in emulsion containing distillates, petroleum, hydrotreated light, water dispersible ultra high molecular weight cationic polymer containing adipic acid, water soluble ultra high molecular weight cationic polymer, water dispersible high molecular weight cationic polymer, water soluble very high molecular weight anionic polymer, or any combination thereof.

(82) The method of any one of aspects 65-77, wherein the polymer is added in an aqueous solution, the solution containing from about 10 g to about 80 g of 0.5 wt. % of polymer, such as from about 0.05 g to about 0.4 g of 100 wt. % of polymer.

(83) The method of any one of aspects 65-78, wherein the polymer solution is added at a dosage rate of from about 10 g to about 80 g of 0.5 wt. % polymer per pound of solid byproduct, e.g., a dosage rate of from about 0.05 g to about 0.4 g of 100 wt. % polymer per pound of solid byproduct on a weight/weight basis.

(84) The method of any one of aspects 65-83, wherein the removing the agglomerated solid byproduct comprises filtering through a filter material having a rating of from about 1 micron to about 30 microns, such as from about 1 micron to about 10 microns (e.g., about 5 microns).

(85) The method of aspect 84, wherein the filter is woven.

(86) The method of aspects 84 or 85, wherein the filtration occurs via a filter press under pressure (such as a pressure of from about 0 to about 200 psi).

(87) The method of aspect 86, where the filtration step occurs for a period of from about 1 hour to about 3 hours per 33 pounds of solid byproduct containing 5 wt. % solid per 1.7 square feet of filtration area, e.g., from about 1 hour to about 2 hours per 33 pounds of solid byproduct containing 5 wt. % solid per 1.7 square feet of filtration area.

(88) The method of aspects 86 or 87, wherein the pressure increases in step sequence from about 0 psi to about 100 psi.

(89) The method of aspect 88, wherein the pressure is increased from about 0 psi to about 20 psi to about 40 psi, to about 60 psi to about 80 psi to about 100 psi, wherein the pressure is applied for about 1 hour to about 3 hours per 33 pounds solid byproduct at 1.7 square feet of filtration area.

(90) The method of any one of aspects 86-88, wherein the pressure is applied in a dewatering or pressing units such as filter press or membrane press or belt press or screw press.

(91) The method of any one of aspects 65-90, wherein the cake contains about 25 to about 50 wt. % solids, such as about 25 to about 40 wt. % solids.

(92) A method of preparing animal feed, such as poultry feed or aquatic animal feed, the method comprising: (a) providing gaseous substrate comprising at least two of the following: $H_2$, CO, and $CO_2$; (b) fermenting the gaseous substrate in a bioreactor with bacteria in a liquid medium to produce a broth including an oxygenated product, water, and solid byproduct; (c) removing the oxygenated product from the broth to produce an oxygenated product-depleted broth; (d) separating a solid byproduct from the broth and/or the oxygenated product-depleted broth, the solid byproduct containing solid particles; (e) treating the solid byproduct with alkaline material effective to increase pH of the solid byproduct to a value of from about 7 to about 8.5 (e.g., from about 7.5 to about 8.1); (f) adding coagulant to the alkaline-treated solid byproduct, the coagulant effective to reduce the net charge of the particles; (g) adding polymer to the solid byproduct with reduced net charge, the polymer effective to agglomerate the particles so they have an average particle size of at least about 1 mm (e.g., from about 1 mm to about 10 mm); and (h) removing the agglomerated solid byproduct particles to produce a cake and a clarified stream filtrate, the cake being effective for use as animal feed.

(93) The method of aspect 92, further comprising drying the cake, the dried product is effective as an animal feed.

(94) The method of aspect 92 or 93, wherein the animal feed contains protein, fat, minerals, and/or carbohydrate, e.g., 86% protein, 2% fat, 2% minerals, 10% carbohydrate.

(95) The method of any one of aspects 92-94, wherein the alkaline material comprises spent sodium hydroxide, such as from a sanitization step for CIP cleaning, the sanitization comprising the steps of initial flush with clean water, sodium hydroxide clean and final rinse with clean water.

(96) The method of any one of aspects 92-95, wherein the substrate gas is produced from coal, biomass, plants, natural gas, municipal or industrial waste, or any combination thereof.

(97) The method of aspect 96, wherein the substrate gas is produced from gasification of coal, and the solid byproduct comprises biomass.

(98) The method of any one of aspects 92-97, wherein the alkaline material is an aqueous solution of lime, sodium hydroxide, soda ash, or any combination thereof.

(99) The method of any one of aspects 92-98, wherein the alkaline material is added at a dosage rate of from about 0.4 g to about 0.8 g of lime, or from about 0.3 g to about 0.6 g of sodium hydroxide, or from about 0.5 g to about 1.0 g of soda ash per pound of solid byproduct, e.g., a dosage rate of from about 0.3 g to about 1 g of alkaline material per pound of solid byproduct on a weight/weight basis.

(100) The method of any one of aspects 92-99, wherein the alkaline material is an aqueous solution of lime, the solution containing from about 20 g to about 40 g of 2 wt. % of lime, such as from about 0.4 g to about 0.8 g of 100 wt. % of lime.

(101) The method of any one of aspects 92-99, wherein the alkaline material is an aqueous solution of sodium hydroxide, the solution containing from about 1 g to about 2 g of 40 wt. % of sodium hydroxide, such as from about 0.3 g to about 0.6 g of 100 wt. % of sodium hydroxide.

(102) The method of any one of aspects 92-99, wherein the alkaline material is an aqueous solution of soda ash, the solution containing from about 35 g to about 70 g of 2 wt. % of soda ash, such as from about 0.5 g to about 1 g of 100 wt. % of soda ash.

(103) The method of any one of aspects 92-102, the coagulant characterized as chemically having cationic (positive) or anionic (negative) charged metal ions.

(104) The method of aspect 103, wherein the coagulant is an aluminum chlorohydrate (ACH) with cationic aluminum charged ions or dimethylamine epichlorohydrin copolymer cationic charged ions rated as GRAS or aluminum sulfate (alum), or polyaluminum chloride (PAC), ferric chloride, ferric sulfate, ferrous sulfate, polyamine with cationic charged ions, or any combination thereof, preferably an aluminum chlorohydrate with cationic aluminum charged ions or dimethylamine epichlorohydrin copolymer with cationic charged ions, or any combination thereof.

(105) The method of any one of aspects 92-104, wherein the coagulant is added in an aqueous solution, the solution containing from about 1 wt. % to about 10 wt. % of coagulant.

(106) The method of any one of aspects 92-105, wherein the coagulant solution is added at a dosage rate of from about 0.5 g to about 2 g per pound of solid byproduct on a weight/weight basis.

(107) The method of any one of aspects 92-106, the polymer is highly charged (e.g., containing about 20-40% anionic or cationic concentration of charged particles).

(108) The method of aspect 107, wherein the polymer is a water soluble anionic polymer containing distillates, petroleum, hydrotreated light or cationic emulsion based on polyacrylamide with containing less than 50% polymer with 2-propenamide, or cationic water-soluble polymer in emulsion containing distillates, petroleum, hydrotreated light, or cationic emulsion based on polyacrylamide containing 20-50% (w/w) ethanaminium,N,N,N-trimethyl-2-chloride, polymer with 2-propenamide and 20-50% (w/w) distillates, hydrated light, or cationic water-soluble polymer in emulsion containing 20-30% (w/w) distillates, petroleum, hydrated light and less than 5% (w/w) poly(oxy-1,2-ethanediyl), a-tridecyl-w-hydroxy-, branched or cationic water soluble polymer in emulsion, or any combination thereof, preferably a water soluble anionic polymer containing distillates, petroleum, hydrotreated light or cationic emulsion based on polyacrylamide with containing less than 50% polymer with 2-propenamide, or cationic water-soluble polymer in emulsion containing distillates, petroleum, hydrotreated light, water dispersible ultra high molecular weight cationic polymer containing adipic acid, water soluble ultra high molecular weight cationic polymer, water dispersible high molecular weight cationic polymer, water soluble very high molecular weight anionic polymer, or any combination thereof.

(109) The method of any one of aspects 92-104, wherein the polymer is added in an aqueous solution, the solution containing from about 10 g to about 80 g of 0.5 wt. % of polymer, such as from about 0.05 g to about 0.4 of 100 wt. % of polymer.

(110) The method of any one of aspects 92-105, wherein the polymer solution is added at a dosage rate of from about 10 g to about 80 g of 0.5 wt. % polymer per pound of solid byproduct, e.g., a dosage rate of from about-0.05 g to about 0.4 g of 100 wt. % polymer per pound of solid byproduct on a weight/weight basis.

(111) The method of any one of aspects 92-110, wherein the removing the agglomerated solid byproduct comprises filtering through a filter material having a rating of from about 1 micron to about 30 microns, such as from about 1 micron to about 10 microns (e.g., about 5 microns).

(112) The method of aspect 111, wherein the filter is woven.

(113) The method of aspects 111 or 112, wherein the filtration occurs via a filter press under pressure (such as a pressure of from about 0 to about 200 psi).

(114) The method of aspect 113, where the filtration step occurs for a period of from about 1 hour to about 3 hours per 33 pounds of solid byproduct containing 5 wt. % solid per 1.7 square feet of filtration area, e.g., from about 1 hour to about 2 hours per 33 pounds of solid byproduct containing 5 wt. % solid per 1.7 square feet of filtration area.

(115) The method of aspects 113 or 114, wherein the pressure increases in step sequence from about 0 psi to about 100 psi.

(116) The method of aspect 115, wherein the pressure is increased from about 0 psi to about 20 psi to about 40 psi to about 60 psi to about 80 psi to about 100 psi, wherein the pressure is applied for about 1 hour to about 3 hours per 33 pounds solid byproduct at 1.7 square feet of filtration area.

(117) The method of any one of aspects 113-116, wherein the pressure is applied in a dewatering or pressing units such as filter press or membrane press or belt press or screw press.

(118) The method of any one of aspects 91-117, wherein the cake contains about 25 to about 50 wt. % solids, such as about 25 to about 40 wt. % solids.

It shall be noted that the preceding aspects are illustrative and not limiting. Other exemplary combinations are apparent from the entirety of the description herein. It will also be understood by one of ordinary skill in the art that various aspects may be used in various combinations with the other aspects provided herein.

The following examples further illustrate the invention but, of course, should not be construed as in any way limiting its scope.

Example 1

This example sets forth experimental and comparative experiments that demonstrate processes for dewatering solid byproduct using various type of chemical treatments of solid byproduct.

A solid byproduct undergoes pre-treatment testing. Lime, sodium hydroxide, or magnesium hydroxide, or soda ash is used to stabilize the pH around 7.8. Once the pH is stabilized, the solid charged particles are neutralized by utilizing coagulant. After neutralization of the solid particles, polymer is added to agglomerate the solid particles to generate larger flocs to easily separate solids while utilizing dewatering technologies such as filter press, screw press, centrifuge, etc. The experiments were conducted with 500 ml of solid byproduct while utilizing various sequences of chemical addition to evaluate the effectiveness of pre-treatment. The test volume in each experiment was 500 mL. After successful pre-treatment, the conditioned solution undergoes the squeezing test. The conditioned solution is manually squeezed and visually checked for stickiness of solids utilizing a belt filter (provided by FBS of Houston, Texas) and filter press filter (provided by Henan Dazhang of Henan, China). The pre-treatment experiments that are unable to generate larger flocs were not tested for squeeze tests since it will plug up the filter immediately. Experiments 1-10 were feasibility tests with various chemistry sequences. Experiments 1, 7, and 10 were inventive experiments while Experiments 2-6 and Experiments 8-9 were comparative.

The pre-treatment experimental test results are listed in Table 1.

TABLE 1

| Experiment # | 2% Lime (mL) | 10M Sodium hydroxide (mL) | 2% Soda Ash (mL) | Mg(OH)$_2$ (g) | Neat Coagulant (mL) | 0.5% Polymer (mL) | Results |
|---|---|---|---|---|---|---|---|
| 1 | — | 1 | — | — | 1 | 50 | Good flocs with little fragile in nature. |
| 2 | 25 | — | — | — | — | — | No flocs were generated. |
| 3 | 25 | — | — | — | — | 50 | No flocs were generated. |
| 4 | — | — | — | 6.4 | 1 | 50 | Fine, flaky flocs were very fragile in nature. |
| 5 | — | — | — | 6.4 | — | 80 | No flocs were generated even after addition of extra polymer. |
| 6 | — | — | — | 6.4 | — | — | No flocs were generated. |

TABLE 1-continued

| Experiment # | 2% Lime (mL) | 10M Sodium hydroxide (mL) | 2% Soda Ash (mL) | Mg(OH)$_2$ (g) | Neat Coagulant (mL) | 0.5% Polymer (mL) | Results |
|---|---|---|---|---|---|---|---|
| 7 | — | — | 42 | — | 1 | 50 | Larger flocs not fragile in nature. |
| 8 | — | — | 42 | — | — | 60 | No flocs were generated. |
| 9 | — | — | 42 | — | — | — | No flocs were generated. |
| 10 | 24.5 | — | — | — | 1 | 30 | Excellent flocs were generated and able to decant 60% water just by gravity separation. |

The pre-treated solution was used for the squeeze test to evaluate qualitative stickiness while utilizing the belt press filter and filter press filter. The results from the filter press filter are listed in Table 2.

TABLE 2

| Exp # | Filter Press (FP) filter (5 micron) |
|---|---|
| 1 | Cake was produced with no indication of stickiness. |
| 2 | Filter press filter test was not conducted as pre-treatment was unsuccessful. |
| 3 | Filter press filter test was not conducted as pre-treatment was unsuccessful. |
| 4 | Cake was produced with high stickiness. |
| 5 | Filter press filter test was not conducted as pre-treatment was unsuccessful. |
| 6 | Filter press filter test was not conducted as pre-treatment was unsuccessful. |
| 7 | Cake was produced with no indication of stickiness. |
| 8 | Filter press filter test was not conducted as pre-treatment was unsuccessful. |
| 9 | Filter press filter test was not conducted as pre-treatment was unsuccessful. |
| 10 | Cake was easily removed from the filter without any stickiness. |

Figure 2R:
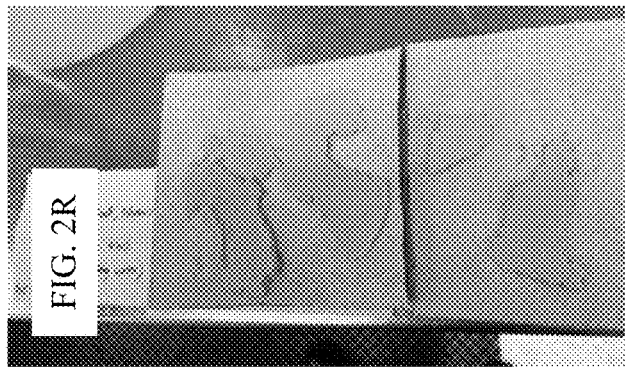
FIGS. 2A-2S are photographs illustrating the results from different experimental and comparative experiments for the dewatering process, as described in Example 1.

Results for samples that underwent conditioning of solid byproduct utilizing sodium hydroxide, coagulant, and polymer, pre-treatment indicated a quick generation of good flocs with little fragility in nature as shown in the photograph in FIG. 2A. Squeeze tests indicated the generation of cake with minimal or no stickiness as shown in the photographs in FIGS. 2B and 2C.

Results for samples that underwent conditioning of solid byproduct utilizing lime only, pre-treatment indicated no flocs were generated as shown in the photograph in FIG. 2D. Squeeze tests were not applicable as no flocs were created after the pretreatment.

Results for samples that underwent conditioning of solid byproduct utilizing lime and polymer, pre-treatment indicated no flocs were generated as shown in the photograph in FIG. 2E. Squeeze tests were not applicable as no flocs were created after the pretreatment.

Results for samples that underwent conditioning of solid byproduct utilizing magnesium hydroxide, coagulant, and polymer, pre-treatment indicated fine and flaky flocs that were very fragile in nature as shown in FIG. 2F. Squeeze tests indicated that a cake was produced with high stickiness as shown in the photographs in FIGS. 2G and 2H.

Results for samples that underwent conditioning of solid byproduct utilizing magnesium hydroxide and polymer, pre-treatment indicated no flocs were generated even after addition of extra polymer as shown in the photograph in FIG. 2I. Squeeze tests were not applicable as no flocs were created after the pretreatment.

Results for samples that underwent conditioning of solid byproduct utilizing magnesium hydroxide only, pre-treatment indicated no flocs were generated as shown in the photographs in FIG. 2J. Squeeze tests were not applicable as no flocs were created after the pretreatment.

Results for samples that underwent conditioning of solid byproduct utilizing soda ash, coagulant, and polymer, pre-treatment indicated the generation of large flocs with no fragility in nature as shown in the photographs in FIGS. 2K and 2L. Squeeze tests indicated generation of cake with minimal or no stickiness as shown in the photographs in FIGS. 2M and 2N.

Figure 2Q:
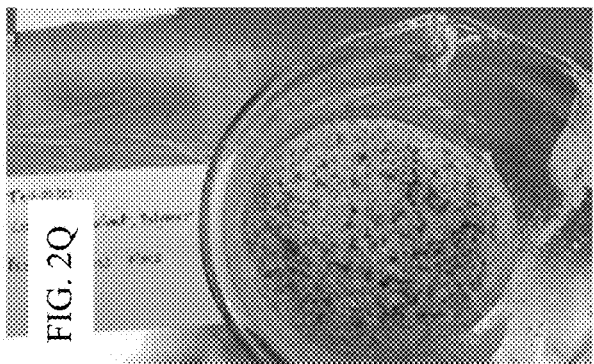
Figure 2S:
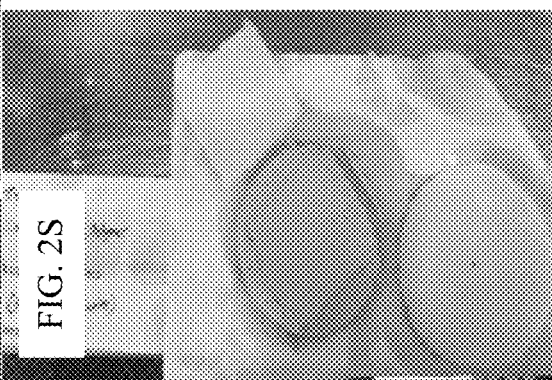
Figure 2P:
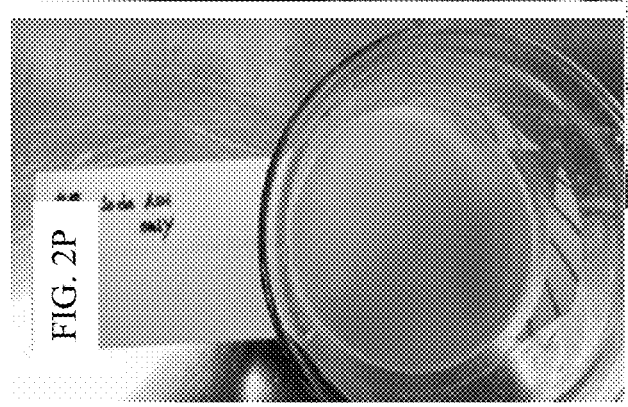
Figure 2O:
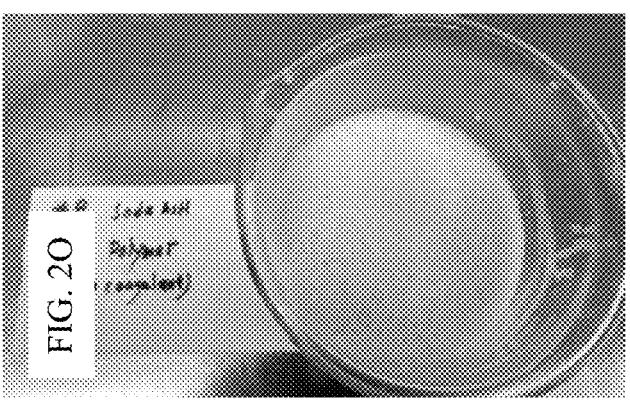

Results for samples that underwent conditioning of solid byproduct utilizing soda ash and polymer, pre-treatment indicated no flocs were generated as shown in the photograph in FIG. 2O. Squeeze tests were not performed due to no generation of flocs.

Results for samples that underwent conditioning of solid byproduct utilizing soda ash only, pre-treatment indicated no flocs were generated as shown in the photograph in FIG. 2P. Squeeze tests were not performed due to no generation of flocs.

Results for samples that underwent conditioning of solid byproduct utilizing lime, coagulant, and polymer, pre-treatment indicated well-formed flocs with no fragility in nature as shown in the photograph in FIG. 2Q. Squeeze tests indicated cake with minimal or no stickiness was generated as shown in the photographs in FIGS. 2R and 2S.

The results indicate that the sequence of chemical addition is useful for successful conditioning of solid byproduct. The well-conditioned solid byproduct can be easily squeezed by external pressure while producing cake with no or minimal stickiness. The sequence to add chemicals is in order of alkaline material followed by coagulant, then addition of polymer. Experiments 1, 7, and 10 had the best results because the experiments produced excellent flocs having no fragility and were able to generate non- or minimally-sticky cakes after the squeeze tests.

Example 2

This example sets forth experimental and comparative experiments that demonstrate the effectiveness of pre-treatment by evaluation of addition of chemicals in various sequences (coagulant followed by agglomerated polymer (flocculant), simultaneous addition of coagulant and flocculant, or flocculant followed by coagulant) into the alkaline treated solid byproduct. The effect from potential sequences was evaluated in relation to the production of good flocs that can be easily dewatered while producing non-sticky cake.

In order to evaluate various sequences of chemical addition for dewatering, jar tests were used to evaluate and analyze the order of method steps in accordance with embodiments of the disclosure. A dewatering test was performed. For comparative purposes, a sequence of chemical addition of coagulant followed by flocculant after pH adjustment with alkaline material (sodium hydroxide (sometimes referred to as "caustic") and/or lime) was used as a control (baseline) experiment as it was successful for conditioning of solid byproduct prior to introduction into filter press. The experiments were conducted with 200 mL of solid byproduct while utilizing various sequences of chemical addition to evaluate the effectiveness of pre-treatment. The experiments are listed in Table 3.

neutralized by utilizing coagulant followed by flocculant, or simultaneous addition of coagulant and flocculant, or reverse addition (flocculant followed by coagulant). The dosing rate of coagulant and flocculant were 0.85 mL and 0.37 mL per gm of TSS, respectively, for all of the samples. The dosing rate was based on the protocol outlined in Example 1.

Experiment 2A: After the pH adjustment, coagulant was added and mixed thoroughly by pouring the sample into an empty container back and forth for 5 times to ensure it was well mixed with the coagulant and to generate pin flocs. Once the pin flocs were generated, polymer was added and mixed thoroughly by pouring the sample back and forth for 5 times into an empty container to agglomerate and generate large flocs.

Experiment 2B: After the pH adjustment, coagulant and polymer were added simultaneously and mixed thoroughly by pouring the sample back and forth for 5 times into an empty container to ensure it was well mixed with coagulant and polymer to agglomerate/generate large flocs.

Experiment 2C: After the pH adjustment, polymer was added, mixed thoroughly by pouring the sample into an empty container back and forth for 5 times to ensure it was well mixed with the polymer to generate flocs. Once well-mixed with polymer, coagulant was added and mixed thoroughly by pouring the sample back and forth for 5 times into an empty container to agglomerate and generate large flocs.

After conditioning of the solid byproduct samples, the flocs were visually observed to identify the generation of suitable flocs for dewatering equipment (filter press). The drainage tests were conducted to evaluate drainage rate and filtrate quality utilizing a laboratory filter system having a 5-micron filter press filter. If the filtrate quality and drainage was satisfactory, the experiments were further conducted for dewatering evaluation in the filter press system. If there was

TABLE 3

| Experiment # | Description of experiment |
| --- | --- |
| 2A | Conditioning of solid byproduct utilizing the sequence of addition of sodium hydroxide/lime followed by coagulant, and then polymer (Baseline) |
| 2B | Conditioning of solid byproduct utilizing simultaneous addition of coagulant and flocculant after pH adjustment with sodium hydroxide/lime |
| 2C | Conditioning of solid byproduct by adding sequence of polymer followed by coagulant after pH adjustment with sodium hydroxide/lime |

Three 200 mL samples of representative solid byproduct with known total suspended solids (TSS) concentration were prepared. Sodium hydroxide (sometimes referred to as "caustic") was used for all the samples to increase the pH to around 6 and then added lime to stabilize the pH around 6.5. Once the pH was stabilized, the solid charged particles were a poor drainage rate and unsatisfactory filtrate quality, the dewatering tests were not conducted as poor conditioning material will plug up the filter (often quickly) and generate a sticky cake.

The experimental test results from pre-treatment are listed in Table 4.

TABLE 4

| Exp # | 1M Sodium hydroxide (mL) | 2% Lime (mL) | 5% Coagulant (mL) | 0.5% Polymer (mL) | Results |
| --- | --- | --- | --- | --- | --- |
| 2A | 4 | 3 | 12 | 5.2 | Successful conditioning with excellent flocs. Dosing rate of coagulant and polymer was adequate. |

TABLE 4-continued

| Exp # | 1M Sodium hydroxide (mL) | 2% Lime (mL) | 5% Coagulant (mL) | 0.5% Polymer (mL) | Results |
|---|---|---|---|---|---|
| | | | | | Well-formed medium size flocs with no or little fragility. Indication of the separation of solid and liquid during the conditioning process. Conditioned or separated liquid is clear indicating no excess or lack of dewatering chemistry. |
| 2B | 4 | 3 | 12 | 5.2 | Poor conditioning resulting in generation of premature flocs. Partially conditioning of the solid byproduct producing partial flocs. Separated liquid not clear indicating unreacted coagulant and polymer in the solution. Unreacted coagulant and polymer display tendency to produce stickiness on the filter media. The flocs are flaky and not well formed indicating premature flocs. |
| 2C | 4 | 3 | 12 | 5.2 | Unsuccessful conditioning as no good flocs were generated. Fine and flaky flocs were observed. No indication of the separation of solid and liquid during the conditioning process. Conditioned or separated liquid is milky or cloudy or turbid indicating unreacted coagulant and polymer are in the solution. |

Figure 3C:
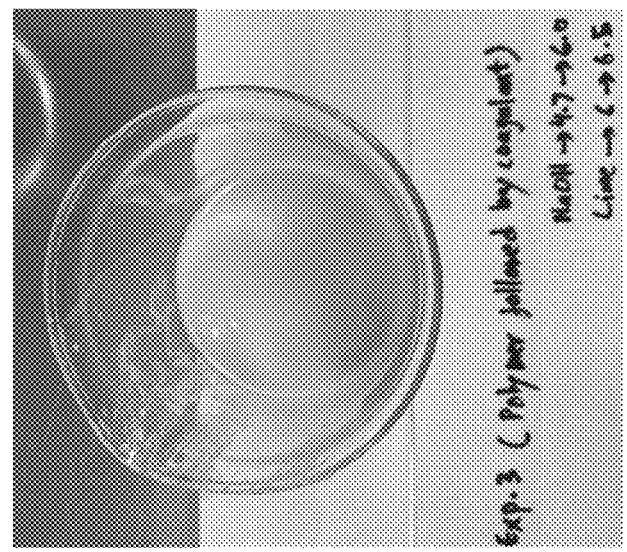
FIGS. 3A-3C are photographs illustrating the results from different experimental and comparative experiments for the dewatering process, as described in Example 2.
Figure 3B:
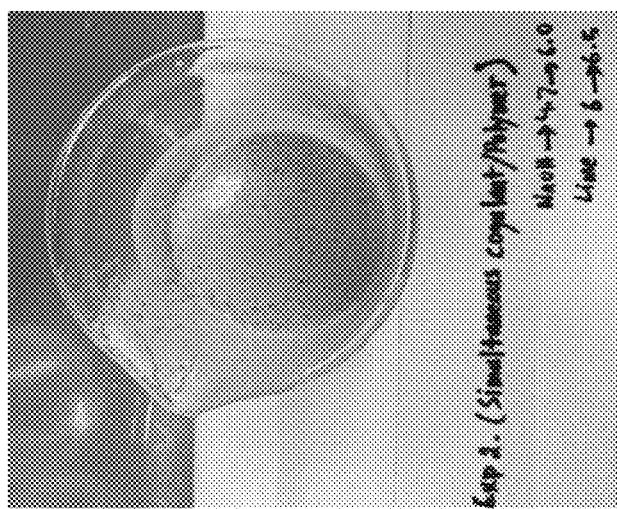
Figure 3A:
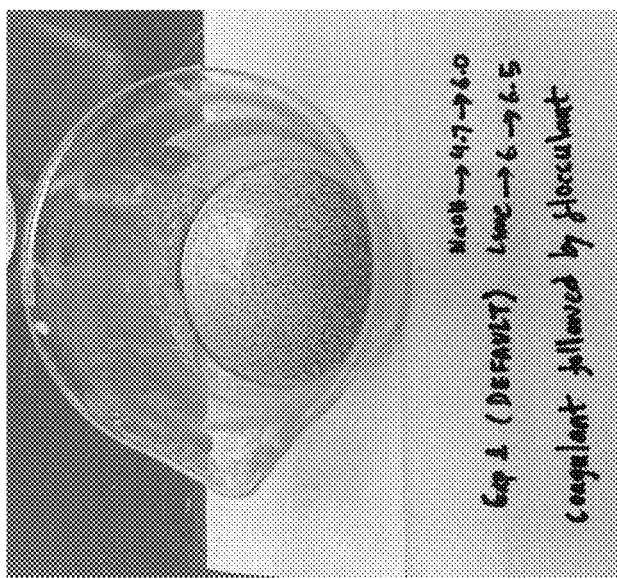
Figures 4A, 4B, 4C, 4D:
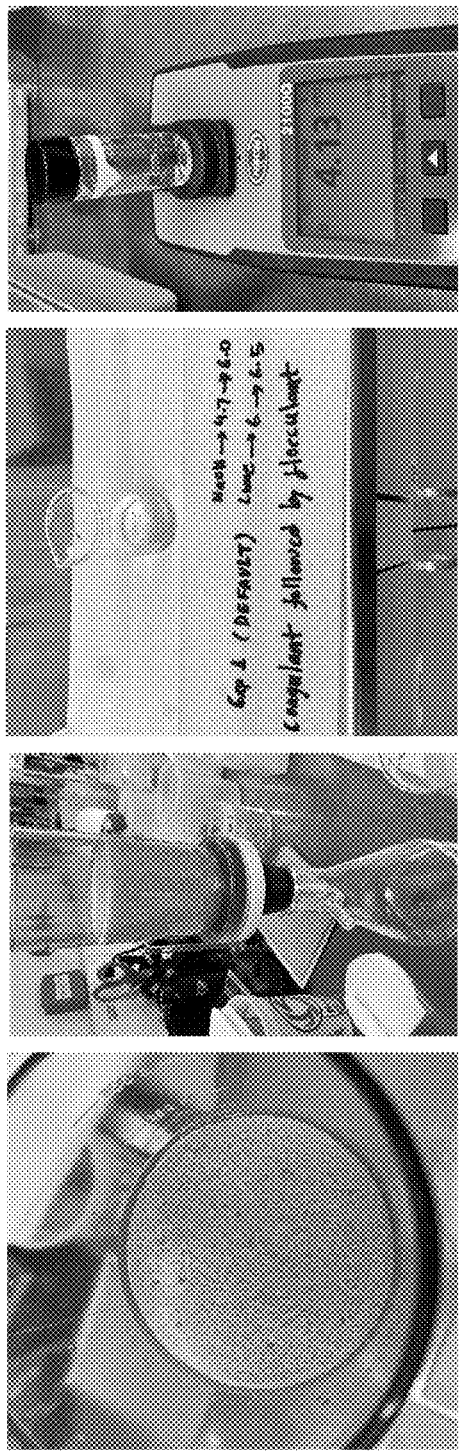
FIGS. 4A-4D are photographs illustrating the results from different experimental and comparative experiments for the dewatering process, as described in Example 2.
Figures 6A, 6B, 6C, 6D:
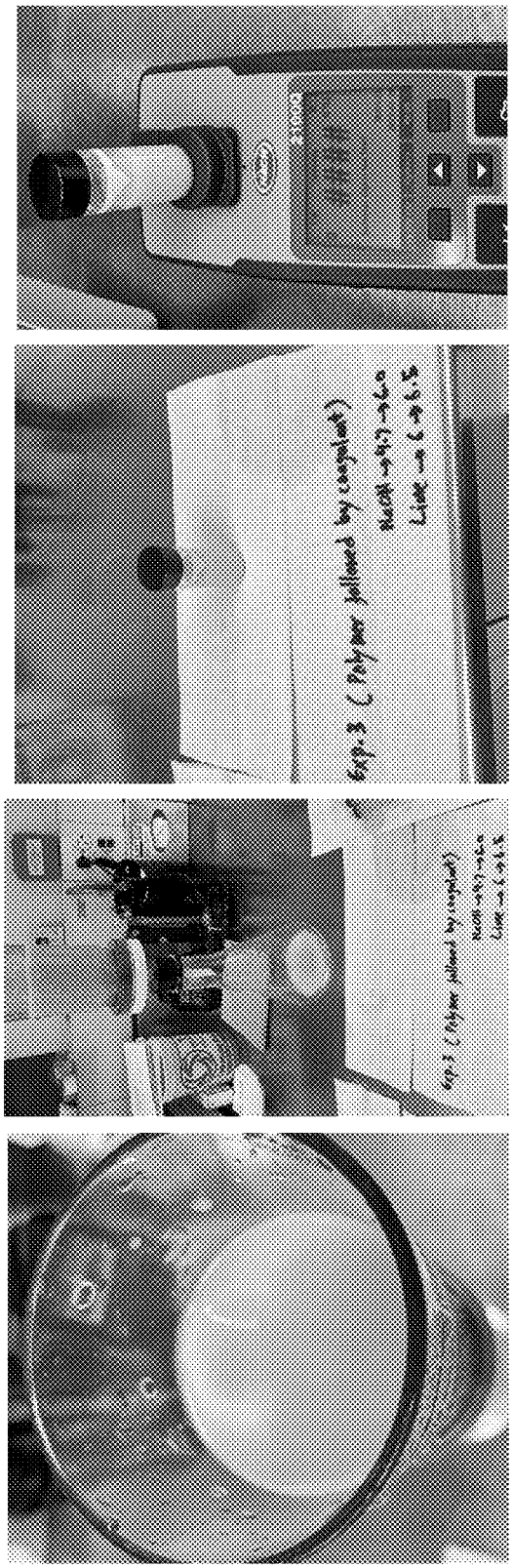
FIGS. 6A-6D are photographs illustrating the results from different experimental and comparative experiments for the dewatering process, as described in Example 2.

The generation of conditioned solid byproduct from Experiments 2A, 2B, and 2C are shown in the photographs in FIGS. 3A, 3B, and 3C respectively. As seen in FIG. 3A, Experiment 2A generated well-formed flocs. As seen in FIG. 3B, Experiment 2B generated poor flocs. As seen in FIG. 3C, Experiment 2C generated no flocs.

The pre-treated solution was used for drainage tests to evaluate qualitative analysis of dewatering potential and estimation of stickiness while utilizing a laboratory filtration system having a 5-micron filter cloth that was used for the pilot filter press system. The drainage tests were performed by pouring the conditioned material into the laboratory filtration system at atmospheric conditions without utilizing pressure or vacuum. The results are listed in Table 5.

Experiment 2A involved conditioning of solid byproduct utilizing the sequential addition of sodium hydroxide/lime followed by coagulant, and then polymer (control/baseline). Photographs of the conditioned product, drainage test, and filtrate, and turbidity (lack of clarity of a solution) can be found in FIGS. 4A-4D, respectively. It will be appreciated by one skilled in the art that "NTU" refers to nephelometry turbidity unit, which is a measurement of the turbidity of the solution. The experiment resulted in successful conditioning of solid byproduct followed by drainage test for 10 minutes while producing 15 mL of filtrate containing 4.1 NTU.

Experiment 2B involved conditioning of solid byproduct utilizing simultaneous addition of coagulant and flocculant after pH adjustment with sodium hydroxide/lime. Photo-

TABLE 5

| Exp # | Pre-treatment | Lab filtration apparatus with Filter press filter cloth (5 micron) | General Remarks |
|---|---|---|---|
| 2A | Well-formed medium size flocs with no or little fragility | 15 mL of clear filtrate (4.1 NTU) was produced after 10 minutes of drainage test. The solid cake on the filter easily came off of the filter. | Filtration test was successful as it produced very clean filtrate and a comparatively higher drainage rate. |
| 2B | Flaky and premature flocs (poor conditioned flocs) | 10 mL of clear filtrate (15.2 NTU) was produced after 10 minutes of drainage test. The solid cake on the filter appeared sticky or gummy in nature. | Potential to produce clean filtrate, however, the drainage rate was low and flocs were flaky/sticky in nature. Possible to generate sticky cake during dewatering process. |
| 2C | No well-formed flocs or fine/flaky flocs | 11 mL of cloudy or turbid filtrate (>2000 NTU) was produced after 10 minutes of drainage test. | Unable to produce clean filtrate and normal drainage rate. Possible to generate sticky sludge instead of well-formed cake during the dewatering process. | graphs of the conditioned product, drainage test, filtrate, and turbidity can be found in FIGS. 5A-5D, respectively. The experiment resulted in poor conditioning of solid byproduct followed by drainage test for 10 minutes while producing 10 mL of filtrate containing 15.2 NTU.

Experiment 2C involved conditioning of solid byproduct utilizing addition of flocculant followed by coagulant after pH adjustment with sodium hydroxide/lime. Photographs of the conditioned product, drainage test, filtrate, and turbidity can be found in FIGS. 6A-6D, respectively. The experiment resulted in very poor or no conditioning of solid byproduct followed by drainage test for 10 minutes while producing 11 mL of filtrate containing over 2000 NTU. The filtrate may contain unreacted charged particles due to reverse addition of chemistry.

Surprisingly and unexpectedly, the experimental results indicate the sequential addition of coagulant followed by polymer was successful in generating well-conditioned solid byproduct that can be easily dewatered and generated non-sticky, dry cake. The simultaneous addition of coagulant and polymer produced poorly conditioned solid byproduct (i.e., partly flocs and charged particles) and generated poor drainage rate. The polymer followed by coagulant (reverse order) was unsuccessful in generating any flocs (very poor or no conditioning) and poor drainage rate while producing cloudy or turbid filtrate. The filter press tests were not performed for experiments 2B and 2C as jar tests were unable to generate minimum level of conditioned solid byproduct by simultaneous addition of coagulant/flocculant or reversed addition of the chemistry i.e., flocculant followed by coagulant.

Accordingly, the experiments together indicate that sequence of chemicals can play a useful role for conditioning of solid byproduct. Desirably, the steps of addition can be in the order of alkaline material followed by coagulant, then addition of (agglomerating) polymer, to generate successful conditioned solid byproduct which can be easily squeezed by external pressure without generating a sticky cake.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of dewatering solid byproduct comprising:
   a. fermenting syngas to produce an oxygenated compound and solid byproduct containing water and solid particles,
      i. the syngas comprising at least two of the following components:
         $CO$, $CO_2$, and $H_2$, and
      ii. wherein the oxygenated compound is ethanol, butanol, butyrate, acetate, propanol, propionate, or any combination thereof;
   b. treating the solid byproduct with alkaline material effective to increase pH of the solid byproduct to a value of from about 7 to about 8.5;
   c. adding coagulant to the alkaline-treated solid byproduct, the coagulant effective to reduce net charge of the particles;
   d. adding polymer to the solid byproduct having particles with reduced net charge, the polymer effective to agglomerate the particles so they have an average particle size of at least about 1 mm;
   e. removing the oxygenated compound from the solid byproduct particles; and
   f. dewatering the agglomerated solid byproduct particles using a solid separation unit to form a cake separated from a clarified stream filtrate, the cake containing the solid byproduct, wherein the dewatering occurs before or after the removal of the oxygenated compound from the solid byproduct particles.

2. The method of claim 1, wherein the solid byproduct comprises biomass.

3. The method of claim 1, further comprising gasifying coal to produce the syngas.

4. The method of claim 1, wherein the alkaline material is an aqueous solution of lime, sodium hydroxide, soda ash, or any combination thereof.

5. The method of claim 1, wherein the alkaline material comprises an aqueous solution of lime, the solution containing from about 20 g to about 40 g of 2 wt. % of lime.

6. The method of claim 1, wherein the alkaline material comprises an aqueous solution of sodium hydroxide, the solution containing from about 1 g to about 2 g of 40 wt. % of sodium hydroxide.

7. The method of claim 1, wherein the alkaline material comprises an aqueous solution of soda ash, the solution containing from about 35 g to about 70 g of 2 wt. % of soda ash.

8. The method of claim 1, wherein the coagulant is polyamine with cationic charged ions, an aluminum chlorohydrate with cationic aluminum charged ions, dimethylamine epichlorohydrin copolymer cationic charged ions, aluminum sulfate (alum), polyaluminum chloride (PAC), ferric chloride, ferric sulfate, ferrous sulfate, or any combination thereof.

9. The method of claim 1, wherein the coagulant is added in an aqueous solution, the solution containing from about 1 wt. % to about 10 wt. % of coagulant, and wherein the coagulant solution is added at a dosage rate of from about 0.5 g to about 2 g per pound of solid byproduct on a weight/weight basis.

10. The method of claim 1, wherein the polymer is:
   i. a water soluble anionic polymer containing distillates, and/or petroleum, optionally comprising hydrotreated light petroleum;
   ii. a cationic emulsion based on polyacrylamide containing less than 50% polymer with 2-propenamide;
   iii. an emulsified cationic water-soluble polymer containing distillates, and/or petroleum, optionally comprising hydrotreated light petroleum;
   iv. a cationic emulsion based on polyacrylamide containing 20-50% (w/w) ethanaminium, N,N,N-trimethyl-2-chlonde;
   v. a polymer with 2-propenamide and 20-50% (w/w) distillates, and/or petroleum, optionally comprising hydrotreated light petroleum;
   vi. an emulsified cationic water-soluble polymer containing 20-30% (w/w) distillates, and/or petroleum, optionally comprising hydrotreated light petroleum;
   vii. less than 5% (w/w) poly(oxy-1,2-ethanediyl);
   viii. an emulsified a-tridecyl-w-hydroxy-, branched or cationic water soluble polymer;
   ix. a water dispersible ultrahigh molecular weight cationic polymer containing adipic acid;
   x. a water soluble ultrahigh molecular weight cationic polymer;
   xi. a water dispersible high molecular weight cationic polymer;
   xii. a water soluble very high molecular weight anionic polymer; or
   xiii. any combination thereof.

11. The method of claim 1, wherein the polymer is added in an aqueous solution, the solution containing from about 10 g to about 80 g of 0.5 wt. % of polymer.

12. The method of claim 11, wherein the polymer solution is added at a dosage rate of from about 10 g to about 80 g of 0.5 wt. % polymer per pound of solid byproduct on a weight/weight basis.

13. The method of claim 1, wherein the solid separation unit comprises a filter having a rating of from about 1 micron to about 30 microns.

14. The method of claim 13, wherein the filter is woven.

15. The method of claim 1, wherein the dewatering uses a filter press as the solid separation unit, the filter press operating under pressure of from about 0 to about 200 psi.

16. The method of claim 15, wherein the pressure of the filter press increases in step sequence from about 0 psi to about 100 psi.

17. The method of claim 1, wherein, prior to dewatering, the byproduct containing agglomerated particles contains about 25 to about 50 wt. % solids.

18. A method of dewatering solid byproduct comprising:
   a. fermenting syngas to produce solid byproduct containing water and solid particles;
   b. treating the solid byproduct with alkaline material effective to increase pH of the solid byproduct to a value of from about 7 to about 8.5,
   C. adding coagulant to the alkaline-treated solid byproduct, the coagulant effective to reduce net charge of the particles;
   d. adding polymer to the solid byproduct having particles with reduced net charge, the polymer effective to agglomerate the particles so they have an average particle size of at least about 1 mm;
   e. dewatering the agglomerated solid byproduct particles using a filter press to form a cake separated from a clarified stream filtrate, the cake containing the solid byproduct, wherein the filter press operates at a pressure that increases in step sequence from about 0 psi to about 100 psi, with the pressure being increased from about 0 psi to about 20 psi, then to about 40 psi, then to about 60 psi, then to about 80 psi, and then to about 100 psi, and wherein the pressure is applied in total for about 1 to about 3 hours per 33 pounds solid byproduct in 1.7 square feet of filtration area.

19. A method of dewatering solid byproduct comprising:
   a. fermenting syngas to produce solid byproduct containing water and solid particles;
   b. treating the solid byproduct with alkaline material effective to increase pH of the solid byproduct to a value of from about 7 to about 8.5, wherein the alkaline material comprises spent sodium hydroxide from sanitization for clean in place (CIP) cleaning of equipment used in the fermenting;
   c. adding coagulant to the alkaline-treated solid byproduct, the coagulant effective to reduce net charge of the particles;
   d. adding polymer to the solid byproduct having particles with reduced net charge, the polymer effective to agglomerate the particles so they have an average particle size of at least about 1 mm;
   e. dewatering the agglomerated solid byproduct particles to form a cake separated from a clarified stream filtrate, the cake containing the solid byproduct.

20. The method of claim 19, wherein the equipment includes at least one of a bioreactor, media feed, recycle loop system, a heat exchanger, distillation equipment, and/or a beer well.

* * * * *